United States Patent
Basmov et al.

(10) Patent No.: US 9,477,614 B2
(45) Date of Patent: *Oct. 25, 2016

(54) SECTOR MAP-BASED RAPID DATA ENCRYPTION POLICY COMPLIANCE

(71) Applicant: Microsoft Technology Licensing, LLC, Redmond, WA (US)

(72) Inventors: Innokentiy Basmov, Redmond, WA (US); Magnus Bo Gustaf Nyström, Sammamish, WA (US); Alex M. Semenko, Issaquah, WA (US); Douglas M. MacIver, Seattle, WA (US); Donghui Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,167

(22) Filed: Oct. 3, 2014

(65) Prior Publication Data

US 2015/0033039 A1  Jan. 29, 2015

Related U.S. Application Data

(63) Continuation of application No. 13/221,629, filed on Aug. 30, 2011, now Pat. No. 8,874,935.

(51) Int. Cl.
*G06F 11/30* (2006.01)
*G06F 12/14* (2006.01)
(Continued)

(52) U.S. Cl.
CPC ........... *G06F 12/1408* (2013.01); *G06F 12/14* (2013.01); *G06F 21/602* (2013.01); *G06F 21/6218* (2013.01)

(58) Field of Classification Search
CPC ................................. G06F 12/14; G06F 12/12

USPC .......................... 713/1, 2, 189, 193; 711/112
See application file for complete search history.

(56) References Cited

U.S. PATENT DOCUMENTS 5,495,533 A   2/1996  Linehan et al.
5,897,661 A * 4/1999  Baranovsky .......... G06F 3/0608
                                                707/999.202
(Continued)

FOREIGN PATENT DOCUMENTS

CN       1653422     8/2005
CN     102646077     8/2012
(Continued)

OTHER PUBLICATIONS

"Foreign Office Action", CN Application No. 201210314748.X, Sep. 23, 2014, 14 Pages.
(Continued)

*Primary Examiner* — Abu Sholeman
(74) *Attorney, Agent, or Firm* — Timothy Churna; Dan Choi; Micky Minhas

(57) ABSTRACT

To comply with a policy for a computing device indicating that data written by the computing device to the storage volume after activation of the policy be encrypted, a sector map is accessed. The sector map identifies one or more sectors of a storage volume and also identifies, for each of the one or more sectors of the storage volume, a signature of the content of the sector. In response to a request to read the content of a sector, the content of the sector is returned without decrypting the content if the sector is one of the one or more sectors and the signature of the content of the sector matches the signature of the sector identified in the sector map. Otherwise, the content of the sector is decrypted and the decrypted content is returned.

24 Claims, 8 Drawing Sheets

(51) Int. Cl.
*G06F 21/60* (2013.01)
*G06F 21/62* (2013.01)
*G06F 17/00* (2006.01)

(56) References Cited

U.S. PATENT DOCUMENTS

| | | | |
|---|---|---|---|
| 5,966,263 A * | 10/1999 | Freitas | G11B 25/043 360/31 |
| 5,974,503 A * | 10/1999 | Venkatesh | G06F 11/1076 348/E5.008 |
| 6,016,402 A * | 1/2000 | Thomas | G06F 3/0601 361/679.37 |
| 6,028,725 A * | 2/2000 | Blumenau | G06F 3/0613 360/48 |
| 6,041,386 A * | 3/2000 | Bello | G06F 3/0607 711/112 |
| 6,067,199 A * | 5/2000 | Blumenau | G06F 3/061 360/48 |
| 6,076,143 A * | 6/2000 | Blumenau | G06F 3/061 711/111 |
| 6,134,062 A * | 10/2000 | Blumenau | G06F 3/061 360/48 |
| 6,151,665 A * | 11/2000 | Blumenau | G06F 3/061 707/999.202 |
| 6,170,037 B1 * | 1/2001 | Blumenau | G06F 3/061 360/15 |
| 6,170,055 B1 * | 1/2001 | Meyer | G06F 9/4406 713/2 |
| 6,253,300 B1 * | 6/2001 | Lawrence | G06F 3/0611 711/112 |
| 6,292,317 B1 * | 9/2001 | Alexander | B82Y 10/00 360/31 |
| 6,292,790 B1 | 9/2001 | Krahn et al. | |
| 6,665,784 B2 * | 12/2003 | Ihde | G11B 20/1217 369/124.06 |
| 6,727,896 B2 * | 4/2004 | Tsang | G06F 3/0418 178/18.02 |
| 6,728,379 B1 | 4/2004 | Ishibashi et al. | |
| 6,789,162 B1 * | 9/2004 | Talagala | G06F 3/0613 707/999.001 |
| 6,944,742 B1 * | 9/2005 | Shoff | G06F 3/0608 711/170 |
| 6,968,973 B2 * | 11/2005 | Uyttendaele | G06F 17/30855 221/2 |
| 6,996,696 B2 * | 2/2006 | Shoff | G06F 3/0608 711/170 |
| 7,356,662 B2 * | 4/2008 | Shoff | G06F 3/0608 711/170 |
| 7,360,073 B1 * | 4/2008 | Billstrom | G06F 21/575 713/1 |
| 7,380,140 B1 * | 5/2008 | Weissman | G06F 21/575 709/213 |
| 7,382,883 B2 | 6/2008 | Cross et al. | |
| 7,409,623 B2 * | 8/2008 | Baker | G06F 11/1004 714/763 |
| 7,451,484 B1 | 11/2008 | Nadalin et al. | |
| 7,536,536 B1 * | 5/2009 | Joshi | G06F 8/65 713/1 |
| 7,559,088 B2 | 7/2009 | Cohen et al. | |
| 7,580,950 B2 | 8/2009 | Kavuri et al. | |
| 7,594,087 B2 * | 9/2009 | Zeevi | G06F 12/0246 711/110 |
| 7,646,380 B2 * | 1/2010 | Tsang | G06F 3/0418 178/18.02 |
| 7,694,134 B2 | 4/2010 | Witt et al. | |
| 7,711,923 B2 * | 5/2010 | Rogers | G06F 12/0292 711/103 |
| 7,725,703 B2 | 5/2010 | Hunter et al. | |
| 7,757,100 B2 * | 7/2010 | Weissman | G06F 21/575 709/213 |
| 7,849,254 B2 * | 12/2010 | Ash | G06F 11/2089 711/103 |
| 7,890,664 B1 * | 2/2011 | Tao | G06F 9/4411 710/15 |
| 7,903,549 B2 | 3/2011 | Judge et al. | |
| 7,930,540 B2 | 4/2011 | Ahuja et al. | |
| 7,962,739 B2 * | 6/2011 | Childs | G06F 11/1417 713/1 |
| 7,979,626 B2 * | 7/2011 | Rogers | G06F 11/1441 711/103 |
| 8,046,365 B2 * | 10/2011 | Saito | G06F 21/6227 707/673 |
| 8,046,533 B2 * | 10/2011 | Kompella | G06F 3/0608 711/112 |
| 8,085,933 B2 * | 12/2011 | Ferguson | H04L 9/0637 380/29 |
| 8,214,656 B1 | 7/2012 | Plotkin et al. | |
| 8,234,477 B2 * | 7/2012 | Shaath | G06F 12/1466 711/163 |
| 8,249,257 B2 | 8/2012 | Brutch et al. | |
| 8,321,688 B2 | 11/2012 | Auradkar et al. | |
| 8,341,427 B2 | 12/2012 | Auradkar et al. | |
| 8,341,430 B2 | 12/2012 | Ureche et al. | |
| 8,387,109 B2 * | 2/2013 | Ureche | G06F 21/6218 707/694 |
| 8,411,863 B2 | 4/2013 | Ureche et al. | |
| 8,416,954 B1 | 4/2013 | Raizen et al. | |
| 8,417,973 B2 * | 4/2013 | Cooper | G06F 1/3221 711/111 |
| 8,423,792 B2 | 4/2013 | Luciani et al. | |
| 8,458,490 B2 | 6/2013 | Konetski et al. | |
| 8,527,561 B1 * | 9/2013 | Moody, II | G06F 17/30182 707/822 |
| 8,538,919 B1 * | 9/2013 | Nielsen | G06F 9/5077 380/277 |
| 8,549,271 B1 * | 10/2013 | Joshi | G06F 8/65 713/1 |
| 8,583,879 B2 * | 11/2013 | Na | G06F 3/0613 711/112 |
| 8,588,422 B2 | 11/2013 | Beachem et al. | |
| 8,625,802 B2 | 1/2014 | Parann-Nissany | |
| 8,661,193 B1 * | 2/2014 | Cobos | G11B 20/10 711/100 |
| 8,667,213 B2 * | 3/2014 | Rogers | G06F 12/0292 711/103 |
| 8,689,279 B2 * | 4/2014 | Basmov | G06F 21/6218 365/120 |
| 8,726,407 B2 * | 5/2014 | Etchegoyen | G06F 21/57 713/176 |
| 8,769,305 B2 | 7/2014 | Blaisdell | |
| 8,874,935 B2 | 10/2014 | Basmov et al. | |
| 8,875,304 B2 | 10/2014 | Celi, Jr. et al. | |
| 2001/0000265 A1 | 4/2001 | Schreiber et al. | |
| 2003/0084298 A1 | 5/2003 | Messerges et al. | |
| 2003/0196114 A1 | 10/2003 | Brew et al. | |
| 2003/0221095 A1 * | 11/2003 | Gaunt | G06F 11/1417 713/1 |
| 2004/0090811 A1 * | 5/2004 | Kang | G11C 11/22 365/145 |
| 2004/0174345 A1 * | 9/2004 | Tsang | G06F 3/0418 345/173 |
| 2005/0071280 A1 | 3/2005 | Irwin et al. | |
| 2005/0097341 A1 | 5/2005 | Francis et al. | |
| 2005/0213377 A1 * | 9/2005 | Shoff | G06F 3/0608 365/185.2 |
| 2005/0262361 A1 | 11/2005 | Thibadeau | |
| 2005/0265074 A1 * | 12/2005 | Shoff | G06F 3/0608 365/185.08 |
| 2005/0283730 A1 * | 12/2005 | Uyttendaele | G06F 17/30855 715/720 |
| 2006/0101027 A1 * | 5/2006 | Hotchkiss | G06Q 99/00 |
| 2006/0155919 A1 * | 7/2006 | Lasser | G11C 11/5621 711/103 |
| 2006/0190984 A1 | 8/2006 | Heard et al. | |
| 2006/0206507 A1 * | 9/2006 | Dahbour | G06F 17/30604 |
| 2006/0277590 A1 | 12/2006 | Limont et al. | |
| 2006/0279556 A1 * | 12/2006 | Tsang | G06F 3/0418 345/173 |
| 2007/0028231 A1 | 2/2007 | Kelso et al. | |
| 2007/0058806 A1 * | 3/2007 | Ferguson | H04L 9/0637 380/42 |
| 2007/0150886 A1 | 6/2007 | Shapiro | |
| 2007/0244940 A1 | 10/2007 | Devarakonda et al. | |
| 2007/0250678 A1 * | 10/2007 | Ueoka | G06F 3/0605 |

(56) References Cited

U.S. PATENT DOCUMENTS

| | | | |
|---|---|---|---|
| 2007/0300008 A1* | 12/2007 | Rogers | G06F 12/0292 711/170 |
| 2007/0300037 A1* | 12/2007 | Rogers | G06F 12/0292 711/103 |
| 2008/0002830 A1 | 1/2008 | Cherkasov et al. | 711/202 |
| 2008/0005467 A1* | 1/2008 | Morley | G06F 3/0613 711/113 |
| 2008/0082448 A1 | 4/2008 | Meijer et al. | |
| 2008/0083036 A1 | 4/2008 | Ozzie et al. | |
| 2008/0107262 A1 | 5/2008 | Helfman et al. | |
| 2008/0130156 A1* | 6/2008 | Chu | G11B 20/18 360/71 |
| 2008/0141040 A1 | 6/2008 | Biddle et al. | |
| 2008/0155316 A1* | 6/2008 | Pawar | G06F 11/1076 714/6.13 |
| 2008/0168315 A1* | 7/2008 | Mead | G01R 33/1207 714/49 |
| 2008/0229428 A1* | 9/2008 | Camiel | G06F 17/30082 726/27 |
| 2008/0240441 A1 | 10/2008 | Kawakami | |
| 2008/0263371 A1* | 10/2008 | Weissman | G06F 21/575 713/193 |
| 2008/0301470 A1 | 12/2008 | Green et al. | |
| 2009/0024795 A1* | 1/2009 | Kobara | G06F 12/0864 711/118 |
| 2009/0063756 A1* | 3/2009 | Asipov | G06F 21/10 711/103 |
| 2009/0075630 A1 | 3/2009 | Mclean | |
| 2009/0132474 A1* | 5/2009 | Ma | G06F 17/30451 |
| 2009/0205012 A1 | 8/2009 | Jain et al. | |
| 2009/0210267 A1 | 8/2009 | Fish et al. | |
| 2009/0287874 A1* | 11/2009 | Rogers | G06F 11/1441 711/103 |
| 2009/0307563 A1* | 12/2009 | Marquez | G11B 20/1883 714/769 |
| 2010/0100721 A1 | 4/2010 | Su et al. | |
| 2010/0107213 A1* | 4/2010 | Ureche | G06F 21/6218 726/1 |
| 2010/0169948 A1* | 7/2010 | Budko | G06F 21/53 726/1 |
| 2010/0250847 A1* | 9/2010 | Chen | G06F 11/2094 711/114 |
| 2010/0266132 A1 | 10/2010 | Bablani et al. | |
| 2010/0299152 A1 | 11/2010 | Batchu et al. | |
| 2010/0306175 A1 | 12/2010 | Johnson et al. | |
| 2010/0332725 A1* | 12/2010 | Post | G06F 12/126 711/103 |
| 2011/0010560 A1* | 1/2011 | Etchegoyen | G06F 11/2025 713/189 |
| 2011/0035577 A1 | 2/2011 | Lin et al. | |
| 2011/0055559 A1 | 3/2011 | Li et al. | |
| 2011/0060915 A1* | 3/2011 | Tal | 713/189 |
| 2011/0078760 A1* | 3/2011 | De Perthuis | G06F 21/6218 726/1 |
| 2011/0087890 A1 | 4/2011 | Munsil et al. | |
| 2011/0154023 A1 | 6/2011 | Smith et al. | |
| 2011/0202916 A1 | 8/2011 | VoBa et al. | |
| 2011/0246785 A1 | 10/2011 | Linsley et al. | |
| 2011/0247047 A1* | 10/2011 | Loureiro | H04L 63/10 726/1 |
| 2011/0252232 A1 | 10/2011 | De Atley et al. | |
| 2011/0264925 A1 | 10/2011 | Russo et al. | |
| 2011/0276683 A1 | 11/2011 | Goldschlag et al. | |
| 2011/0277013 A1 | 11/2011 | Chinta | |
| 2012/0017095 A1 | 1/2012 | Blenkhorn et al. | |
| 2012/0036347 A1 | 2/2012 | Swanson et al. | |
| 2012/0036370 A1* | 2/2012 | Lim | H04L 9/0822 713/189 |
| 2012/0079603 A1 | 3/2012 | Brown et al. | |
| 2012/0087033 A1* | 4/2012 | Yang | G11B 5/012 360/39 |
| 2012/0110345 A1 | 5/2012 | Pigeon et al. | |
| 2012/0159148 A1* | 6/2012 | Behren | G06Q 20/3552 713/150 |
| 2012/0173882 A1* | 7/2012 | Horn | G06F 21/78 713/189 |
| 2012/0239618 A1 | 9/2012 | Kung | |
| 2012/0297190 A1 | 11/2012 | Shen et al. | |
| 2012/0331550 A1 | 12/2012 | Raj et al. | |
| 2013/0013856 A1* | 1/2013 | Rogers | G06F 12/0292 711/103 |
| 2013/0054977 A1* | 2/2013 | Basmov | G06F 21/6218 713/189 |
| 2013/0054979 A1* | 2/2013 | Basmov | G06F 21/602 713/193 |
| 2013/0067242 A1 | 3/2013 | Lyakhovitskiy et al. | |
| 2013/0074142 A1 | 3/2013 | Brennan et al. | |
| 2013/0086691 A1 | 4/2013 | Fielder | |
| 2013/0117561 A1 | 5/2013 | Chawla et al. | |
| 2013/0117805 A1 | 5/2013 | Kent et al. | |
| 2013/0138971 A1* | 5/2013 | Budko | G06F 21/53 713/189 |
| 2013/0198474 A1* | 8/2013 | Shaath | G06F 12/1466 711/163 |
| 2013/0208893 A1 | 8/2013 | Shablygin et al. | |
| 2013/0291055 A1 | 10/2013 | Muppidi et al. | |
| 2013/0318359 A1 | 11/2013 | Morris et al. | |
| 2014/0007182 A1 | 1/2014 | Qureshi et al. | |
| 2014/0007222 A1 | 1/2014 | Qureshi et al. | |
| 2014/0019753 A1 | 1/2014 | Lowry et al. | |
| 2014/0032691 A1 | 1/2014 | Barton et al. | |
| 2014/0032759 A1 | 1/2014 | Barton et al. | |
| 2014/0032933 A1 | 1/2014 | Smith et al. | |
| 2014/0059690 A1 | 2/2014 | Li et al. | |
| 2014/0081980 A1 | 3/2014 | Aad | |
| 2014/0156705 A1* | 6/2014 | Beecham | G06F 21/6218 707/783 |
| 2014/0156706 A1* | 6/2014 | Beecham | G06F 21/6218 707/783 |
| 2014/0164774 A1 | 6/2014 | Nord et al. | |
| 2014/0181512 A1 | 6/2014 | Spalka et al. | |
| 2014/0230007 A1 | 8/2014 | Roth et al. | |
| 2014/0259117 A1 | 9/2014 | Wachendorf et al. | |
| 2014/0344570 A1 | 11/2014 | Adam et al. | |
| 2014/0344571 A1 | 11/2014 | Adam et al. | |
| 2015/0186657 A1 | 7/2015 | Nakhjiri | |
| 2015/0270956 A1 | 9/2015 | Basmov et al. | |
| 2015/0278531 A1 | 10/2015 | Smith et al. | |
| 2016/0072796 A1 | 3/2016 | Adam et al. | |
| 2016/0080149 A1 | 3/2016 | Mehta et al. | |
| 2016/0127327 A1 | 5/2016 | Mehta | |

FOREIGN PATENT DOCUMENTS

| | | |
|---|---|---|
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| TW | I540453 | 7/2016 |
| WO | WO-0049488 | 8/2000 |
| WO | WO-2004034184 | 4/2004 |
| WO | WO-2004107646 | 12/2004 |
| WO | WO-2009069043 | 6/2009 |
| WO | WO-2012016091 | 2/2012 |
| WO | WO-2012167392 | 12/2012 |

OTHER PUBLICATIONS

"BitLocker Drive Encryption in Windows Vista", Microsoft TechNet, retrieved from <http://technet.microsoft.com/en-us/library/cc725719(WS.10).aspx> on Apr. 25, 2011, Aug. 6, 2010, 9 pages.

"Final Office Action", U.S. Appl. No. 13/221,629, Dec. 23, 2013, 24 pages.

(56) References Cited

OTHER PUBLICATIONS

"International Search Report and Written Opinion", Application No. PCT/US2011/055600, Jul. 30, 2012, 9 pages.
"International Search Report and Written Opinion", Application No. PCT/US2011/055626, Sep. 19, 2012, 9 pages.
"Non-Final Office Action", U.S. Appl. No. 13/221,629, May 17, 2013, 27 pages.
"Non-Final Office Action", U.S. Appl. No. 13/221,699, Apr. 1, 2013, 16 pages.
"Notice of Allowance", U.S. Appl. No. 13/221,629, Jun. 27, 2014, 16 pages.
"Notice of Allowance", U.S. Appl. No. 13/221,699, Oct. 30, 2013, 9 pages.
"Security Solutions and Services", retrieved from <http://www.csc.com/public_sector/offerings/11043/17449-securitysolutionsandservices> on Apr. 25, 2011, 2 pages.
"Unlock BitLocker under Windows PC", Retrieved from: <http://windows7migration.info/index.php option=com_content&view=article&id=1836:unlock-bitlocker-under-windows-pe&catid=42:4sysops&Itemid=61> on Aug. 4, 2011, 5 pages.
Lawson, "Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>,Sep. 19, 2006, pp. 1-18.
Li, et al., "Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>,Dec. 21, 2010, 9 pages.
Mont, et al., "A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>. Mar. 16, 2006, 11 pages.
Toegl, et al., "acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>,2011, 20 pages.
"First Office Action and Search Report Issued in Chinese Patent Application No. 201210314631.1", Mailed Date: Dec. 1, 2014, 14 Pages.
"Extended European Search Report", EP Application No. 11871440.1, Mar. 16, 2015, 5 pages.
"Extended European Search Report", EP Application No. 11871825.3, May 11, 2015, 7 pages.
"Foreign Office Action", CN Application No. 201210314748.X, Mar. 17, 2015, 7 pages.
"Search Report", TW Application No. 100136565, Aug. 3, 2015, 1 pages.
"Non-Final Office Action", U.S. Appl. No. 14/221,105, Aug. 4, 2015, 25 pages.
"Foreign Notice of Allowance", CN Application No. 201210314748.X, Jul. 3, 2015, 3 pages.
"Foreign Notice of Allowance", CN Application No. 201210314631.1, Aug. 20, 2015, 4 pages.
"International Search Report and Written Opinion", Application No. PCT/US2015/021125, Jul. 3, 2015, 9 Pages.
"About EFS (Encrypting File System)", Available at: https://www.elcomsoft.com/help/en/aefsdr/about_efs.html, Oct. 28, 2014, 3 pages.
"Adobe AIR 1.5 Applications with Flex—Storing Encrypted Data", Retrieved From: <http://help.adobe.com/en_US/AIR/1.5/devappsflex/WS5b3ccc516d4fbf351e63e3d118666ade46-7e31.html> May 1, 2015, Oct. 19, 2012, 2 pages.
"Application Encryption-Vormetric Data Security Products", Available at: http://www.vormetric.com/products/vormetric-application-encryption, Jun. 27, 2014, 6 pages.
"Approaches for Encryption of Data at Rest in the Enterprise", In White Papers, 2008, 24 pages.
"Blackberry 10", Retrieved from <http://en.wikipedia.org/wiki/BlackBerry_10#BlackBerry_Balance> on Apr. 2, 2013, Apr. 1, 2013, 8 pages.
"CheckVision Enterprise Encryption", Available at: http://assets1.csc.com/banking/downloads/CardsPayments_CheckVisionEnterprise_DS.pdf, Apr. 24, 2013, 2 pages.
"DataStax Enterprise 3.2", Available at: http://docs.datastax.com/en/datastax_enterprise/3.2/datastax_enterprise/sec/secTDE.html—Retrieved on: Jul. 23, 2015, 2 pages.
"Divide: The Next Generation of Enterprise Mobility", Retrieved at <<http://www.divide.com/download/Divide_Product_Sheet_1116.pdf<< on May 8, 2013, Jan. 20, 2013, 2 pages.
"Exchange ActiveSync", Retrieved from <http://en.wikipedia.org/wiki/Exchange_ActiveSync> on Apr. 1, 2013, 5 pages.
"Exchange ActiveSync: Provisioning Protocol", Retrieved from <http://msdn.microsoft.com/en-us/library/dd299443(v=EXCHG.80).aspx> on Apr. 1, 2013, Dec. 3, 2008, 4 Pages.
"Final Office Action", U.S. Appl. No. 13/898,368, Apr. 16, 2015, 16 pages.
"How Can We Ensure Data Security on Mobile Devices??", Retrieved From: <http://enterprise.huawei.com/topic/byod_en/solution_byod_info_3.html> Mar. 6, 2014, Jun. 16, 2013, 4 Pages.
"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.
"InnoSetup Help", Retrieved From: <http://www.jrsoftware.org/ishelp/index.php?topic=filessection> May 12, 2015, 8 pages.
"International Search Report and Written Opinion", Application No. PCT/US2013/061053, Jan. 30, 2014, 10 Pages.
"Mobile Device Management", Retrieved from <http://www.bing.com/search?q=mobile+device+management&src=IE-TopResult&FORM=IE10TR> on Apr. 2, 2013, 2 pages.
"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, Nov. 6, 2012, 2 pages.
"Non-Final Office Action", U.S. Appl. No. 13/898,368, Aug. 4, 2015, 17 pages.
"Non-Final Office Action", U.S. Appl. No. 13/898,368, Dec. 8, 2014, 12 pages.
"OMA Device Management", Retrieved from <http://en.wikipedia.org/wiki/OMA_DM> on Apr. 2, 2013, Mar. 25, 2013, 4 Pages.
"OMA Device Management", Retrieved from <http://msdn.microsoft.com/en-us/library/bb737369.aspx>, Aug. 4, 2010, 4 Pages.
"Oracle Advanced Security", Available at: http://www.oracle.com/technetwork/database/security/ds-advanced-security-tde-psft-129631.pdf, Apr. 16, 2011, 2 pages.
"Securing end-user mobile devices in the enterprise", In Proceedings: Thought Leadership White Paper, IBM Global Technology Services, Apr. 2011, 6 Pages.
"ThoriumCloud Enterprise Container", Retrieved from <http://www.thoriumcloud.com/> on Mar. 25, 2013, 4 Pages.
"Transparent Data Encryption (TDE)", Available at: https://msdn.microsoft.com/en-in/library/bb934049.aspx—Retrieved on: Jul. 23, 2015, 11 pages.
"Various Mobile Device Management (MDM) Solutions", Retrieved From: <http://www.bing.com/search?q=mobile+device+management&src=IE-TopResult&FORM=IE10TR> Mar. 5, 2014, 2 Pages.
"What Android Sync'd Data is Encrypted?", Retrieved From: <http://android.stackexchange.com/questions/3129/what-android-syncd-data-is-encrypted>, Nov. 25, 2010, 3 pages.
"Windows Selective Wipe for Device Data Management", Retrieved from <http://technet.microsoft.com/en-us/library/dn486874.aspx>, Nov. 1, 2013, 4 pages.
Adam,"Enterprise Data Protection: Building Universal Windows Apps That Keep Work and Personal Data Separate and Secure", Available at: https://mix.office.com/watch/fd0jojbqv6qx—Retrieved on: Jul. 23, 2015, 20 pages.

(56) References Cited

OTHER PUBLICATIONS

Becher,"Mobile Security Catching Up? Revealing the Nuts and Bolts of the Security of Mobile Devices", Proceedings of IEEE Symposium on Security and Privacy, May 22, 2011, pp. 96-111.
Bugiel,"Practical and Lightweight Domain Isolation on Android", Proceedings of the 1st ACM Workshop on Security and privacy in Smartphones and Mobile Devices, Oct. 17, 2011, 12 pages.
Gudeth,"Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.
Kalogeropoulos,"Oracle Data Pump Encrypted Dump File Support", In Oracle White Paper, Jul. 2011, 15 pages.
Lane,"Cracking the Confusion: Encryption Layers", Available at: https://securosis.com/blog/cracking-the-confusion-encryption-layers, Feb. 12, 2015, 2 pages.
Li,"Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.
Magnabosco,"Transparent Data Encryption", Available at: https://www.simple-talk.com/sql/database-administration/transparent-data-encryption/, Mar. 16, 2010, 19 pages.
Mitchell,"What is a Selective Wipe?", Retrieved from <http://www.landesk.com/blog/what-is-a-selective-wipe/> on Mar. 25, 2013, Apr. 30, 2012, 1 page.
Oberheide,"When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.
Pecherle,"Data Wiping System with Fully Automated, Hidden and Remote Destruction Capabilities", In Journal of WSEAS Transactions on Computers, vol. 9, Issue 9, Available at <http://www.wseas.us/e-library/transactions/computers/2010/88-110.pdf>, Sep. 2010, pp. 939-948.
Pisko,"Trusted Computing in Mobile Platforms—Players, Usage Scenarios, and Interests", Proceedings of Privacy and Security, Sep. 2005, pp. 526-530.
Purdy,"Thumb Drive", Retrieved From: <http://lifehacker.com/5583307/top-10-usb-thumb-drive-tricks-2010-edition> May 12, 2015, Oct. 7, 2010, 6 pages.
Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.
Stehle,"Provisioning, Policies, Remote Wipe, and the Allow/Block/Quarantine list in Exchange ActiveSync", Retrieved from <http://msdn.microsoft.com/en-us/library/exchange/hh509085(v=exchg.140).aspx> on Apr. 1, 2013, 20 pages.
Stockton,"Divide and your Data: Privacy, Sync, Backup, Restore, Storage and Wipe", Retrieved from <http://support.divide.com/entries/20964987-Divide-and-your-data-privacy-sync-backup-restore-storage-and-wipe> on Mar. 25, 2013, Feb. 8, 2012, 2 pages.
Wahl,"Oracle Advanced Security Transparent Data Encryption Best Practices", In Oracle White Paper, Jul. 2012, 29 pages.
Zeis,"The security of BlackBerry Balance", Retrieved From: <http://crackberry.com/security-blackberry-balance> Mar. 6, 2014, Aug. 2, 2013, 13 pages.
"Final Office Action", U.S. Appl. No. 14/221,105, Feb. 22, 2016, 35 pages.
"International Preliminary Report on Patentability", Application No. PCT/US2013/061053, Nov. 24, 2015, 8 pages.
"Non-Final Office Action", U.S. Appl. No. 14/533,921, Apr. 19, 2016, 18 pages.
"Foreign Notice of Allowance", TW Application No. 100136565, Mar. 25, 2016, 4 pages.
"Notice of Allowance", U.S. Appl. No. 13/933,928, Apr. 22, 2016, 8 pages.
"Final Office Action", U.S. Appl. No. 13/898,368, Dec. 2, 2015, 19 pages.
"Foreign Office Action", TW Application No. 100136564, Oct. 20, 2015, 11 pages.
"International Search Report and Written Opinion", Application No. PCT/US2015/049981, Dec. 3, 2015, 11 pages.
"Non-Final Office Action", U.S. Appl. No. 13/933,928, Oct. 21, 2015, 11 pages.
"Non-Final Office Action", U.S. Appl. No. 14/489,288, Nov. 6, 2015, 25 pages.
Menezes,"Handbook of Applied Cryptography", CRC Press LLC, Jan. 1, 1997, pp. 25-27 & 551-553.
"Foreign Notice of Allowance", TW Application No. 100136564, Feb. 25, 2016, 4 pages.
"International Search Report and Written Opinion", Application No. PCT/US2015/058707, Jan. 20, 2016, 11 Pages.
"International Search Report and Written Opinion", Application No. PCT/US2015/048750, Apr. 11, 2016, 22 pages.
"Second Written Opinion", Application No. PCT/US2015/021125, Feb. 2, 2016, 6 pages.
Chen,"Hardware-Assisted Application-Level Access Control", ISC '09 Proceedings of the 12th International Conference on Information Security, Sep. 7, 2009, 16 pages.
Final Office Action, U.S. Appl. No. 14/489,288, Jun. 15, 2016, 25 pages.
Non-Final Office Action, U.S. Appl. No. 14/481,672, Jul. 28, 2016, 12 pages.
Restriction Requirement, U.S. Appl. No. 14/481,672, Jun. 28, 2016, 6 pages.
Second Written Opinion, Application No. PCT/US2015/049981, Jul. 26, 2016, 5 pages.
Foreign Office Action, TW Application No. 105101128, Aug. 23, 2016, 5 pages.
Examiner's Answer to Appeal Brief, U.S. Appl. No. 13/898,368, Sep. 8, 2016, 7 pages.

* cited by examiner

US 9,477,614 B2

SECTOR MAP-BASED RAPID DATA ENCRYPTION POLICY COMPLIANCE

RELATED APPLICATIONS

This application is a continuation of U.S. patent application Ser. No. 13/221,629, filed Aug. 30, 2011, entitled "Sector Map-based Rapid Data Encryption Policy Compliance" to Innokentiy Basmov, et al., the entire disclosure of which is hereby incorporated by reference herein in its entirety.

BACKGROUND

Computers can be used in various settings, sometimes adhering to particular policies. For example, when accessing corporate data such as email from a personal computer, corporate policy may dictate that the personal computer must encrypt corporate data stored on the personal computer's storage device in order to grant access to the corporate data. The computer may be unable to access the particular corporate service until the policy is complied with, but waiting for a storage device to be encrypted (which can be on the order of several minutes or hours, depending on the size of the storage device) in order to use the corporate service can be frustrating for users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request to activate a policy for a computing device is received at the computing device. The policy indicates that data written by the computing device to a storage volume after activation of the policy be encrypted. In response to the request, the policy is activated for the device, including encrypting data written to the storage volume after returning the indication of compliance with the policy, and using a sector map to identify one or more sectors of the storage volume that are not encrypted. Additionally, in response to the request, an indication of compliance with the policy is returned despite one or more sectors of the storage volume being unencrypted.

In accordance with one or more aspects, to comply with a policy for a computing device indicating that data written by the computing device to the storage volume after activation of the policy be encrypted, a sector map is accessed. The sector map identifies one or more sectors of a storage volume and also identifies, for each of the one or more sectors of the storage volume, a signature of the content of the sector. In response to a request to read the content of a sector, the content of the sector is returned without decrypting the content if the sector is one of the one or more sectors identified in the storage map and the signature of the content of the sector matches the signature of the sector identified in the sector map. Otherwise, the content of the sector is decrypted and the decrypted content is returned.

BRIEF DESCRIPTION OF THE DRAWINGS

The same numbers are used throughout the drawings to reference like features.

DETAILED DESCRIPTION

Figure 1:
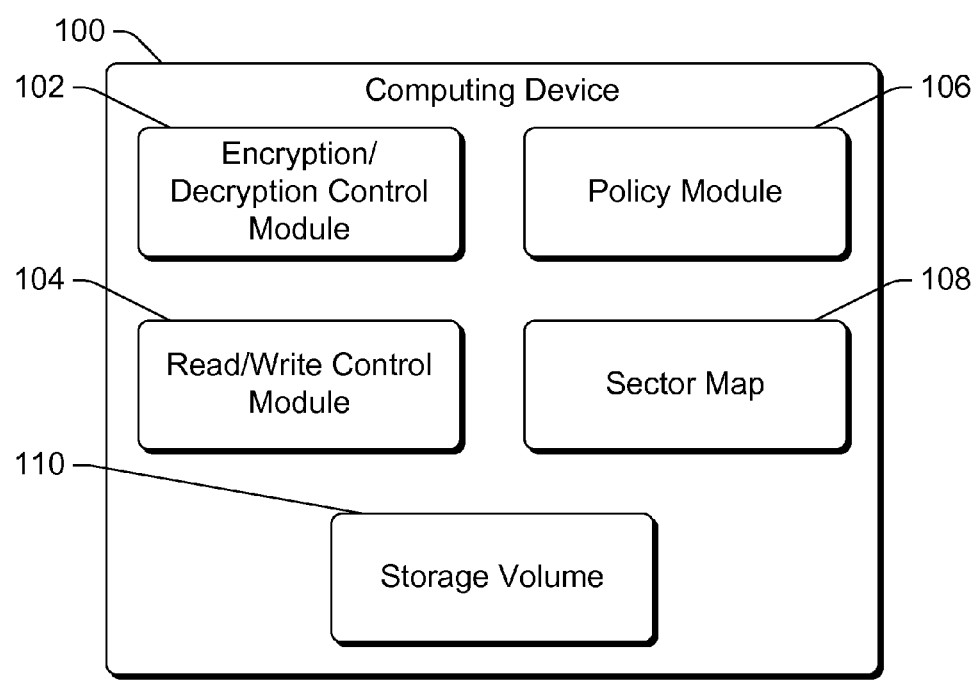
FIG. 1 is a block diagram illustrating an example computing device implementing rapid compliance with a data encryption policy in accordance with one or more embodiments.

Rapid compliance with a data encryption policy is discussed herein. A sector map for a storage volume used by a computing device can be generated, the sector map identifying one or more sectors of a storage volume as well as a signature of the content of each of the one or more sectors. The sector map can be generated shortly after (or as part of) installing an operating system on the computing device, or alternatively at a later time prior to activating a policy for the computing device. The policy activated for the computing device indicates that content written by the computing device to the storage volume after activation of the policy be encrypted. After activation of the policy, the computing device encrypts content written to sectors of the storage volume. Additionally, after activation of the policy, content in a particular sector may or may not be encrypted. The sector map is used to identify which sectors of the storage volume have encrypted content, and thus which content is to be decrypted before being returned to the requester.

Alternatively, an encrypted chunks map for a storage volume used by a computing device can be generated, the encrypted chunks map identifying chunks of sectors of the storage volume. For each chunk of sectors of the storage volume, the encrypted chunks map indicates whether the sectors in the chunk are encrypted (or not in use) or are unencrypted. After activation of a policy for the computing device indicating that content written by the computing device to the storage volume after activation of the policy is encrypted, data written to the storage volume is encrypted. If data is written to a chunk that is unencrypted (as determined by the encrypted chunks map), then the sectors in the chunk are encrypted, the data is encrypted and written to the sector, and the encrypted chunks map is updated to indicate that the chunk is encrypted. Whether data read from the storage volume is decrypted is determined based on whether the sector from which the data is read is unencrypted (as determined by the encrypted chunks map).

References are made herein to cryptography, which can include symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has a key (a public key and/or a private key). The public key of a public/private key pair can be made publicly available, but the private key is kept a secret. Without the private key it is computationally very difficult to decrypt data that is encrypted using the public key. Using some public key cryptography algorithms, data can be encrypted by any entity with the public key and only decrypted by an entity with the corresponding private key. Additionally, using some public key cryptography algorithms, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, authentication codes or message authentication codes can be generated based on symmetric key cryptography, such as using a keyed-hash message authentication code mechanism. Any entity with the shared key can generate and verify the authentication code or message authentication code. For example, a trusted third party can generate a symmetric key based on an identity of a particular entity, and then can both generate and verify the authentication codes or message authentication codes for that particular entity (e.g., by encrypting or decrypting the data using the symmetric key).

FIG. 1 is a block diagram illustrating an example computing device 100 implementing rapid compliance with a data encryption policy in accordance with one or more embodiments. Computing device 100 can be a variety of different types of devices, such as a physical device or a virtual device. For example, computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 100 can also be a virtual device, such as a virtual machine running on a physical device. A virtual machine can be run on any of a variety of different types of physical devices (e.g., any of the various types listed above). Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes an encryption/decryption control module 102, a read/write control module 104, a policy module 106, a sector map 108, and a storage volume 110. Although particular modules 102, 104, and 106 are illustrated in computing device 100, it should be noted that one or more of modules 102, 104, and 106 can be combined into a single module, or that the functionality of one or more of modules 102, 104, and/or 106 can be separated into multiple modules. Encryption/decryption control module 102 manages encryption and decryption of data stored on storage volume 110 using any of a variety of different cryptographic techniques (e.g., using symmetric key cryptography and/or public key cryptography). The data stored on storage volume 110 refers to any information that can be stored, such as program data, user data, system data, instructions or code, and so forth.

Encryption/decryption control module 102 typically allows data to be encrypted and/or decrypted only when authorized to do so. Module 102 can be authorized to allow data to be encrypted and/or decrypted in different manners. For example, module 102 can be authorized to allow data to be encrypted and/or decrypted only after a user of computing device 100 has proven that he or she possesses valid credentials to access the data. Various different credentials can be used, such as knowledge of a secret phrase (e.g., a password), a private key corresponding to a certificate, a temporal secret (e.g., a one-time password), and so forth. By way of another example, module 102 can be authorized to allow data to be encrypted and/or decrypted only after detecting that computing device 100 is in a particular state (e.g., conforms to a particular policy). By way of yet another example, module 102 can be authorized to allow data to be encrypted and/or decrypted only after obtaining particular encryption and/or decryption keys stored in or by computing device 100.

Read/write control module 104 manages reading data from and writing data to storage volume 110. This reading and writing includes reading and writing of encrypted data (also referred to as ciphertext) as well as unencrypted data (also referred to as plaintext). Read/write control module 104 can invoke module 102 to encrypt and/or decrypt data read and/or written as appropriate.

Policy module 106 implements various policies on computing device 100. Each policy identifies one or more behaviors that device 100 is to follow, such as types of programs that are to be running on device 100 (e.g., anti-malware programs), types of security that are to be implemented by device 100 (e.g., encrypting and decrypting data), and so forth. In one or more embodiments, a policy can indicate that once the policy is activated on device 100 (and optionally until the policy is deactivated), data stored on storage volume 110 is to be encrypted. Activation of a policy refers to the policy being enforced on, and complied with by, computing device 100. Policy module 106 can obtain one or more policies to implement in various manners, such as being pre-configured with one or more policies, receiving a user input (e.g., from an administrative user) of one or more policies, receiving one or more policies from a remote server or service, and so forth.

Storage volume 110 is a storage device that can be implemented using a variety of different technologies, such as a flash memory device, a magnetic disk, an optical disc, combinations thereof, and so forth. Storage volume 110 can also be a portion of a storage device that is treated by computing devices and operating systems logically as a storage device. For example, a storage volume can be a partition of a hard drive, a portion of a flash memory device, and so forth.

Storage volume 110 is illustrated as being included as part of computing device 100. For example, storage volume 110 can be an internal storage device coupled to an internal bus of device 100, such as using a Serial Advanced Technology Attachment (SATA) interface, Parallel ATA (PATA) interface, Small Computer System Interface (SCSI) interface, and so forth. By way of another example, storage volume can be an internal storage device implemented as one or more chips on a same circuit board as chips implementing one or more of modules 102-106, can be an internal storage device implemented in the same chip as one or more of modules 102-106, and so forth.

Storage volume 110 can alternatively be external to computing device 100 and coupled to computing device 100 in a variety of different wired and/or wireless manners. For example, storage volume 110 can be coupled to computing device 100 via a Universal Serial Bus (USB) connection, a wireless USB connection, an IEEE 1394 connection, an external SATA (eSATA) connection, a Bluetooth connection, and so forth. Storage volume 110 can be designed to be coupled to different computing devices (concurrently or at different times). In one or more embodiments, storage volume 110 is a removable volume, such as being part of a storage device designed to be easily coupled to and decoupled from computing device 100 and transported to other computing devices. An example of such a removable storage volume is a thumb drive or USB flash memory device. Alternatively, storage volume 110 can take other forms, such as being a network storage device that is coupled to computing device 100 via a network (e.g., the Internet, a local area network (LAN), a cellular or other phone network, an intranet, a storage area network (SAN), network-attached storage (NAS), other public and/or proprietary networks, combinations thereof, and so forth).

Storage volume 110 includes multiple sectors in which data can be stored. The data stored in a sector is also referred to as the content of that sector. Each sector is a portion of storage volume 110, and different storage volumes can have different sector sizes (e.g., 512 bytes, 4 k bytes, 8 k bytes, and so forth). A storage volume typically has sectors of the same size, but can alternatively have sectors of different sizes. Sector map 108 identifies one or more sectors of storage volume 110 as well as a signature of the content of each of the one or more sectors. The usage of sector map 108 and the signatures of the contents of the sectors are discussed in more detail below. Although discussed herein as operating on a per-sector basis, it should be noted that the techniques discussed herein can alternatively operate based on other groupings of content on storage volume 110 in an analogous manner (e.g., based on groupings of multiple sectors or other collections of content).

Sector map 108 is typically stored on a storage device (e.g., storage volume 110) and copied into a memory (e.g., RAM) of computing device 100 when computing device 100 starts operation (e.g., is powered on, reset, etc.). The memory is typically a volatile memory that does not maintain its state when computing device 100 is powered off, but that typically has faster access time than storage volume 110. Alternatively, sector map 108 can be maintained in a nonvolatile memory (e.g., Flash memory) that does maintain its state when computing device 100 is powered off.

In one or more embodiments, encryption/decryption control module 102, read/write control module 104, and policy module 106 are implemented in an operating system of computing device 100. In response to activation of a policy on computing device 100 indicating data is to be encrypted, data written to storage volume 110 subsequent to activation of the policy is encrypted regardless of the application or other program writing the data to storage. Encryption/decryption control module 102 encrypts data written to storage volume 110 for multiple applications, rather than simply a single application.

Figure 2:
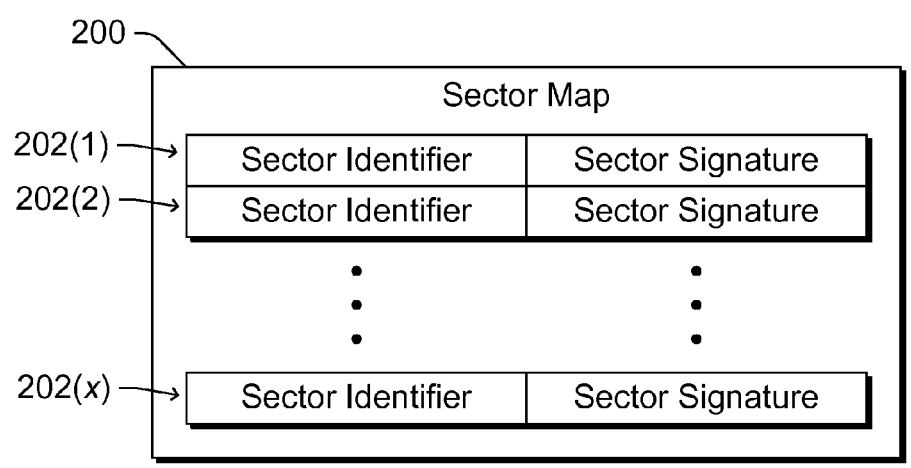
FIG. 2 illustrates an example sector map in accordance with one or more embodiments.

FIG. 2 illustrates an example sector map 200 in accordance with one or more embodiments. Sector map 200 can be, for example, sector map 108 of FIG. 1. Sector map 200 includes multiple sector identifiers and corresponding sector signatures 202(1), . . . 202(x). The sector identifiers in sector map 200 can take a variety of different forms, such as numeric identifiers of the sectors.

It should be noted that although multiple sector identifiers each having a corresponding sector signature are illustrated in FIG. 2, sector map 200 can alternatively be configured in different manners. For example, sector map 200 can arrange sector signatures in groups having a contiguous set or run of sector identifiers. A single sector identifier (e.g., the sector identifier at the beginning or start of the run of sector identifiers) can be included in sector map 200, and then given the size of the sector signatures a particular sector signature within that group can be readily identified. For example, if the sector identifier at the beginning of a group is sector 732 and sector signatures are 6 bytes in length, then it can be readily determined that the sector signature for sector 735 is 3×6=18 bytes offset into the group of sector signatures. Although only a single sector identifier is included in sector map 200 for a group, it should be noted that the sector map is still viewed as identifying the multiple sectors (and corresponding sector signatures) of the sector identifiers in the set or run included in that group.

At a particular point in time, sector map 200 is locked. Sector map 200 being locked refers to sector map 200 being set or fixed in its current state, with no changes to sector map 200 being allowed. Sector map 200 can be locked in various manners, such as being stored in a nonvolatile write-once memory location, being stored in a portion of storage volume 110 accessible only to an operating system of computing device 100 and the operating system refusing to perform any writes to sector map 200, and so forth. Sector map 200 can be locked at different times (e.g., when an operating system is installed or a policy is activated), as discussed in more detail below.

Sector map 200 need not, and typically does not, include an identifier and corresponding signature for every sector of the storage volume. Rather, sector map 200 includes identifiers and corresponding signatures of sectors that were written to prior to sector map 200 being locked. Alternatively, sector map 200 can include identifiers of multiple sectors that were not written to prior to sector map 200 being locked, and also include one or more indications of which identified sectors were written to prior to sector map 200 being locked (e.g., flag values, include signatures for only those sectors that were written to prior to sector map 200 being locked, etc.).

The sector signatures in sector map 200 are a representation of at least part of the content in the sector. Sector signatures can be generated in a variety of different manners as a function of the content of the sector. In one or more embodiments, the signature of a sector is generated by selecting a particular number of bytes of the content of the sector (e.g., the content in the first 6 bytes of the sector, the content in the 8 bytes of the sector starting at the $11^{th}$ byte of the sector, etc.). Alternatively, the signature of a sector can be generated in different manners, such as by applying a variety of different hash algorithms to the content of the sector to obtain a hash value, applying various other algorithms or rules to the content of the sector to obtain a value representing the content of the sector, and so forth.

The sector signatures in sector map 200 are used to identify whether content of the corresponding sector has changed (which can be used to determine whether the content is to be decrypted, as discussed in more detail below) after sector map 200 was locked. At any given time, a signature of the content of a sector identified in sector map 200 can be generated in the same manner as the signature for that sector was generated for sector map 200. The signature from sector map 200 is compared to the generated signature for the sector, and a determination made as to whether the two signatures match (e.g., are the same). If the two signatures match, then the content of the corresponding signature was not changed after sector map 200 was locked. However, if the two signatures do not match, then the content of the corresponding signature was changed after sector map 200 was locked.

In one or more embodiments, sector map 200 is maintained in memory or on a storage device in a manner that facilitates quick access to the content of sector map 200. For example, sector map 200 can be maintained on the storage device in a group of contiguous sectors of the storage device, in a group of contiguous addresses in memory, and so forth. The content of sector map 200 can additionally be stored on the storage device and/or in memory in numeric order based on sector identifier, in a binary tree indexed based sector identifier, and so forth.

In one or more embodiments, the content of sector map 200 is maintained on the storage device in groups of sector identifiers, each group including a contiguous set or run of sector identifiers. Each group includes a header identifying various information about the group, such as the size of the group (e.g., the number of sectors of the storage device that are used to store the group, the number of sector identifiers in the run, etc.), a checksum value for the group, an offset into the storage volume (or memory) to access the first sector identifier and sector signature in the group, and so forth. These groups can then be readily mapped into a sector map in memory when the computing device starts operation (e.g., is powered on, reset, etc.). It should be noted that in such embodiments sector map 200 need not include an identifier of each sector identifier, but rather just an indication of the first sector identifier in the run of sector identifiers and the sector signatures corresponding to the sector identifiers in the run. The sector signature corresponding to a particular sector in the run can thus be readily given the size of the sector signatures.

Returning to FIG. 1, sector map 108 includes identifiers and corresponding signatures of sectors that were written to prior to sector map 108 being locked. After sector map 108 is locked, data written to storage volume 110 is encrypted by encryption/decryption control module 102. Such data can include data written to sectors of storage volume 110 not previously written to, as well as data written to sectors of storage volume 110 that were previously written to (overwriting sectors). However, data written to storage volume 110 prior to sector map 108 being locked is not encrypted. Accordingly, after sector map 108 is locked, sector map 108 is used to determine whether the sector was written to before sector map 108 was locked (and thus is not encrypted), or whether the sector was written to after sector map 108 was locked (and thus is encrypted).

After sector map 108 is locked, when data is requested to be read from a sector of storage volume 110, a check is made (e.g., by read/write control module 104 or policy module 106) as to whether the sector is identified in sector map 108. If the sector is not identified in sector map 108, then the data written to the sector was written after sector map 108 was locked, and thus the content of the sector is encrypted. Accordingly, read/write control module 104 invokes encryption/decryption control module 102 to decrypt the content of the sector prior to returning the content of the sector to the requester.

However, if the sector is identified in sector map 108, then a check is made (e.g., by read/write control module 104 or policy module 106) as to whether the signature of the current content of the sector matches the signature of the sector in sector map 108. If the two signatures match, then the data written to the sector was written before sector map 108 was locked, and thus the content of the sector is not encrypted. Accordingly, read/write control module 104 can return the content of the sector to the requester and need not invoke encryption/decryption control module 102 to decrypt the content of the sector. However, if the two signatures do not match, then the data written to the sector was written after sector map 108 was locked, and thus the content of the sector is encrypted. Accordingly, read/write control module 104 invokes encryption/decryption control module 102 to decrypt the content of the sector prior to returning the content of the sector to the requester.

In one or more embodiments, read/write control module 104 also maintains a bitmap corresponding to storage volume 110, each bit in the bitmap corresponding to a sector of storage volume 110. If a particular sector of volume 110 is written to after sector map 108 is locked (optionally just the first time the particular sector is written to after sector map 108 is locked), module 104 sets (e.g., to a value of 1) the bit corresponding to that particular sector. If a sector has not been written to after sector map 108 was locked then the corresponding bit is not set (e.g., has a value of 0). When reading the content of a sector, if the bit in the bitmap corresponding to the sector is set, module 104 knows that the sector was written to after sector map 108 was locked. Accordingly, module 104 invokes encryption/decryption control module 102 to decrypt the content of the sector prior to returning the content of the sector to the requester. However, if the bit in the bitmap corresponding to the sector is not set, then module 104 proceeds to check whether the sector is identified in sector map 108 and/or whether signatures match as discussed above. Alternatively, writing data to a sector of storage volume 110 and updating of the bitmap (e.g., setting the bit corresponding to the sector to a value of 1) can be performed as an atomic operation, in which case if the bit in the bitmap corresponding to the sector is not set, then module 104 can return the content of the sector to the requester and need not invoke encryption/decryption control module 102 to decrypt the content of the sector.

This bitmap can also be used to address signature collisions. A signature collision occurs when two different contents of a sector result in the same signature. The bitmap allows situations in which there is a signature collision to be resolved because the bit corresponding to a sector is set when the sector is written to, so module 104 knows that the sector was written to after sector map 108 was locked. The bit corresponding to a sector being set indicates that the sector was written to after sector map 108 was locked regardless of whether the signature of the current content of the sector matches the signature of the sector in sector map 108.

Sector map 108 can be generated and locked at a variety of different times. In one or more embodiments, sector map 108 is generated and locked as part of installing or initializing an operating system on computing device 100. This can be done, for example, by a vendor or distributor of computing device 100 (e.g., before the purchaser of computing device 100 receives computing device 100), by a user of computing device 100, and so forth. The generation and locking of sector map 108 can be performed as part of the process of installing the operating system on computing device 100, or as part of a separate initialization or setup process for computing device 100. The operating system is installed on computing device 100 with data written to sectors of storage volume 110 without being encrypted by encryption/decryption control module 102.

In such embodiments, sector map 108 can be generated in various manners. For example, during installation of the operating system a record of which sectors of storage volume 110 are written to can be maintained. The sectors identified in this record can be identified as sectors in sector map 108, and corresponding signatures generated and stored in sector map 108. By way of another example, storage volume 110 can be scanned to identify which sectors were written to and which were not, and those sectors that were written to can be identified as sectors in sector map 108 and corresponding signatures generated and stored in sector map 108. By way of yet another example, an operating system can be installed on computing device 100 by copying a storage volume image to storage volume 110, and this storage volume image can include sector map 108.

Thus, in such embodiments sector map 108 is generated and locked when the operating system is installed on computing device 100, with subsequent writes to storage volume 110 being encrypted as discussed above. When a policy is activated on device 100 indicating that data stored on storage volume 110 after activation of the policy be encrypted, computing device 100 is in rapid compliance with the policy because any data written to storage volume 110 after sector map 108 was locked is encrypted. Computing device 100 need not wait until all of storage volume 100 is encrypted before being in compliance with the policy. Policy module 106 can thus rapidly indicate compliance with the policy despite some sectors of storage volume 110 being unencrypted, because device 100 is already encrypting data written to storage volume 110 (and thus will be encrypting data stored on storage volume 110 after activation of the policy).

As used herein, rapid compliance with a policy refers to compliance within a threshold amount of time and/or without requiring encrypting of an entire storage volume. This threshold amount of time is typically a small number (e.g., on the order of several seconds) that is not expected to cause a noticeable delay to the user. Similarly, rapid indication of compliance with a policy refers to indicating compliance within such a threshold amount of time and/or without requiring encrypting of an entire storage volume. It should be noted that policy module 106 need not intentionally delay in complying with and/or indicating compliance with a policy, but that some delay may occur (e.g., while waiting for device 100 to perform other functions unrelated to complying with the policy, while locking sector map 108, while encrypting particular special-purpose files (e.g., paging files, files used for crash dumps, hibernate files, etc.), and so forth).

In other embodiments, rather than locking sector map 108 as part of installing or initializing an operating system on computing device 100, sector map 108 is locked in response to activation of a policy on computing device 100. Prior to locking sector map 108, data is written to sectors of storage volume 110 without being encrypted by encryption/decryption control module 102, and data is read from sectors of storage volume 110 without being decrypted by module 102. An initial sector map 108 is generated (e.g., as part of installing or initializing an operating system on computing device 100 as discussed above). For each write to a sector, sector map 108 is updated with an identifier of the sector written to (if not already included in sector map 108) and a corresponding signature of the content written to that sector. Thus, in such embodiments sector map 108 is generated over time, and keeps an ongoing current identification of which sectors of storage volume 110 have been written to as well as the signatures of those sectors that have been written to.

In response to a request to activate a policy on computing device 100 indicating that data stored on storage volume 110 after activation of the policy be encrypted, policy module 106 activates the policy. As part of activating the policy, sector map 108 is locked, so subsequent writes to storage volume 110 are encrypted as discussed above. Computing device 100 is in rapid compliance with the policy because data written to storage volume 110 after sector map 108 is locked is encrypted. Computing device 100 need not wait until all of storage volume 100 is encrypted before being in compliance with the policy. Policy module 106 can thus rapidly indicate (e.g., with less than a threshold amount of delay) compliance with the policy even though some sectors of storage volume 110 are unencrypted, because subsequent writes to storage volume 110 will be encrypted, and device 100 thus will be encrypting data stored on storage volume 110 after activation of the policy.

In embodiments in which sector map 108 keeps an ongoing current identification of which sectors of storage volume 110 have been written to as well as the signatures of those sectors that have been written to, sector map 108 can be maintained in memory (e.g., RAM) and persisted on a storage device (e.g., storage volume 110). In such embodiments, the sectors in sector map 108 can be grouped together, with each group being a collection of multiple sectors of sector map 108. The number of sectors in a group can vary, and different groups can have different numbers of sectors. Which sectors are included in which groups can be determined in different manners. For example, sectors can be grouped together by sector number in numeric order, based on hash values of the sector identifiers, and so forth.

Figure 3:
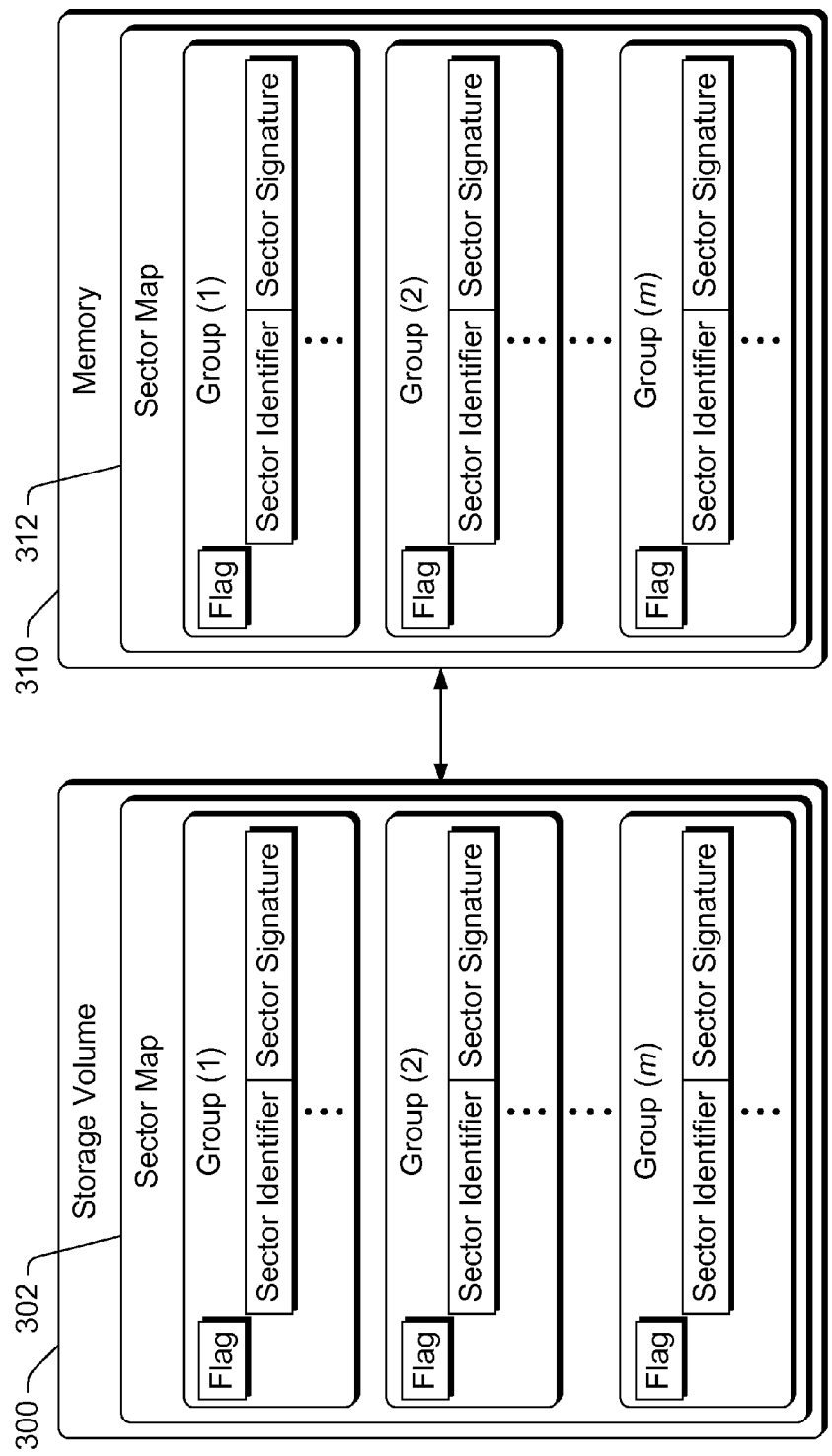
FIG. 3 illustrates an example of sector maps maintained in memory and persisted on a storage device in accordance with one or more embodiments.

FIG. 3 illustrates an example of sector maps maintained in memory and persisted on a storage device in accordance with one or more embodiments. FIG. 3 illustrates a storage volume 300 storing a sector map 302, and a memory 310 storing a sector map 312. Memory 310 is typically a volatile memory that does not maintain its state when the computing device including memory 310 is powered off, but that typically has faster access time than storage volume 300. Sector maps 302 and 312 are each a version of the same sector map, which can be sector map 108 of FIG. 1.

As illustrated, sector maps 302 and 312 each include sectors grouped into multiple groups. Each group includes multiple sector identifiers and corresponding sector signatures. Additionally, each group has a flag indicating whether the group is dirty or clean, which is used as discussed below.

When the computing device starts operation (e.g., is powered on, reset, etc.), sector map 302 is copied from storage volume 300 into memory 310 as sector map 312. At this point, the flag value of each group in sector maps 302 and 312 are set to indicate the corresponding groups are clean (although situations can arise where one or more flag values are set to indicate the corresponding groups are dirty, as discussed below). The group being clean indicates that the content of the group (sector identifiers and corresponding sector signatures) on storage volume 300 is the same as the content of the group in memory 310. When data is subsequently written to a sector of the storage volume, sector map 312 is updated with the signature of the newly written content of that sector. However, sector map 302 is not yet updated to include the signature of the newly written content of that sector. Additionally, the flag for the group in sector map 312 including that sector, as well as the flag for the group in sector map 302 including that sector, is set to indicate the group is dirty (if not already set to indicate the group is dirty). The group being dirty indicates that the content of the group on storage volume 300 is not the same as the content of the group in memory 310.

The content of the dirty groups in sector map 312 are flushed to storage volume 300 at some point. Flushing the dirty groups to storage volume 300 refers to writing the data groups from sector map 312 to sector map 302, and setting the corresponding flags of those written groups in sector maps 302 and 312 to indicate the corresponding groups are clean. The particular point at which the dirty groups are flushed can vary, such as in response to a threshold number of groups being marked dirty, a threshold amount of time elapsing since a group was marked as being dirty, during a time of low storage volume usage (e.g., less than a threshold number of read and/or write access to storage volume 300 in a threshold amount of time), and so forth.

When the computing device again starts operation (e.g., is powered on, reset, etc.), each group of sector map 302 that is marked as clean is copied from storage volume 300 into memory 310 as a group of sector map 312. For each group of sector map 302 that is marked as dirty, the sector signatures for the identified sectors in that group are generated based on the contents of those identified sectors. These generated sector signatures are stored in the group in sector map 302 as well as in sector map 312, and the groups are marked as clean in sector maps 302 and 312. Thus, although situations can arise in which the computing device crashes or loses power before one or more dirty groups in sector map 312 are flushed to storage volume 300, such situations are readily resolved when the computing device again starts operation. The flags in sector map 302 of each of the one or more dirty groups in sector map 312 that were not flushed to storage volume 300 still indicate the group is dirty, and thus the sector signatures are re-generated.

In one or more embodiments, when setting a flag in sector map 302 and sector map 312 due to a particular write to a sector, the write to the sector is not finalized until the flags in maps 302 and 312 are set to indicate the group including the identifier of that sector is dirty. Accordingly, if the computing device were to crash or lose power during a write, the write to the sector would not be finalized before the flags in maps 302 and 312 are set to indicate the group is dirty. Thus, due to a crash or loss of power, situations can arise in which a flag in sector map 302 is set to indicate the group is dirty, but the data that caused that flag to be set to indicate the group is dirty was not actually written to storage volume 300. Such situations are readily resolved because when the computing device again starts operation the flag in sector map 302 is set to indicate that the group is dirty, so the sector signatures of the sectors identified in that group are re-generated. Thus, sector maps 302 and 312 maintain an accurate signature for the sector.

Returning to FIG. 1, in one or more embodiments, in response to activating a policy on computing device 100 indicating that data stored on storage volume 110 after activation of the policy be encrypted, policy module 106 begins the process of encrypting the unencrypted data in sectors of storage volume 110. Which sectors have unencrypted data can be readily identified (e.g., based on sector map 108, based on a bitmap corresponding to storage volume 110 as discussed above, etc.). This can be performed, for example, by requesting that the unencrypted data from a sector be read and then written back to the sector. As the request to write the data back to the sector is received after the policy is activated, the data written back is encrypted. When no unencrypted data remains on storage volume 110, use of sector map 108 can cease—sector map 108 can be deleted and/or ignored because the data that was written to storage volume 110 before sector map 108 was locked has been re-written as encrypted data.

When performing such a process of encrypting the unencrypted data in sectors of storage volume 110, a record of which sectors have been encrypted can be maintained in different manners. For example, after unencrypted data from a sector is read and written back to the storage volume as encrypted data, the sector identifier and corresponding sector signature for that sector can be removed from sector map 108 (effectively unlocking sector map 108 for removal of the sector identifier and corresponding sector signature). By way of another example, after unencrypted data from a sector is read and written back to the storage volume as encrypted data, a bit in a bitmap (which corresponds to storage volume 110 as discussed above) that corresponds to that sector can be set.

Policy module 106 can perform this process of encrypting the unencrypted data in sectors of storage volume 110 in different manners. For example, policy module 106 can monitor computing device 100 for, and perform the process during, times of low storage volume usage (e.g., less than a threshold number of read and/or write access to storage volume 110 in a threshold amount of time). By way of another example, policy module 106 can monitor computing device 100 for, and perform the process during, times when computing device 100 is not typically being used (e.g., between midnight and 4:00 am). By way of yet another example, policy module 106 can monitor computing device 100 for, and perform the process during, times when computing device 100 is plugged in (e.g., operating on AC power rather than on battery power).

Figure 4:
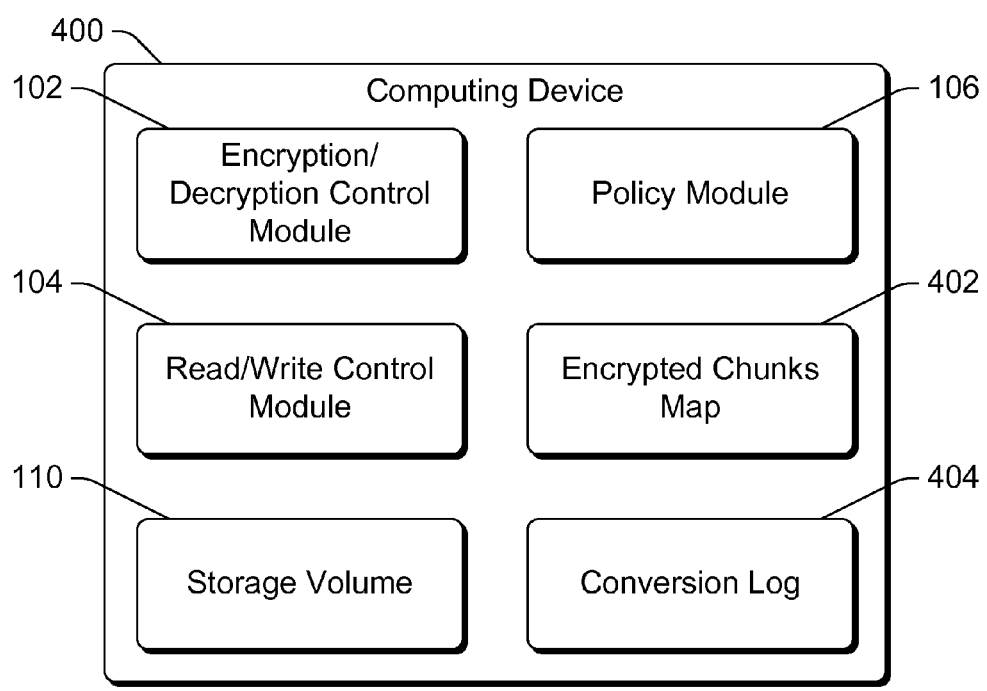
FIG. 4 is a block diagram illustrating another example computing device implementing rapid compliance with a data encryption policy in accordance with one or more embodiments.

FIG. 4 is a block diagram illustrating another example computing device 400 implementing rapid compliance with a data encryption policy in accordance with one or more embodiments. Computing device 400 can be a variety of different types of devices, such as a physical device or a virtual device, analogous to computing device 100 of FIG. 1.

Computing device 400 includes an encryption/decryption control module 102, a read/write control module 104, a policy module 106, and a storage volume 110, analogous to computing device 100 of FIG. 1. However, rather than a sector map, computing device 400 includes an encrypted chunks map 402 and a conversion log 404.

In embodiments using encrypted chunks map 402, encrypted chunks map 402 groups sectors of storage volume 110 together into chunks. Each chunk is a collection of multiple sectors of storage volume 110. The number of sectors in a chunk can vary, and different chunks can have different numbers of sectors. Which sectors are included in which chunks can be determined in different manners. For example, sectors can be grouped together by sector number in numeric order. Encrypted chunks map 402 identifies whether, for each chunk of sectors of storage volume 110, the sectors included in the chunk are unencrypted or encrypted (or optionally not in use). If the sectors in the chunk are unencrypted then the chunk is also referred to as being unencrypted. Similarly, if the sectors in the chunk are encrypted (or not in use), then the chunk is also referred to as being encrypted (or not in use).

Encrypted chunks map 402 is typically a bitmap. For example, encrypted chunks map 402 can include multiple bits, each bit corresponding to a chunk of sectors of storage volume 110, and each bit being set (e.g., to a value of 1) to indicate that the sectors in the corresponding chunk are encrypted (or not in use), or is not set (e.g., have a value of 0) to indicate that the sectors in the corresponding chunk are unencrypted. Alternatively other maps or records other than a bitmap can be used.

Discussions herein make reference to indicating whether a corresponding chunk is encrypted or not in use (e.g., the bit corresponding to the chunk is set). Alternatively, encrypted chunks map 402 can indicate whether a corresponding chunk is encrypted without supporting the possibility that the chunk is not in use. For example, the bit corresponding to the chunk is set to indicate the chunk is encrypted (and is not set solely because the chunk is not in use).

Prior to activation of a policy on computing device 400 indicating that data stored on storage volume 110 after activation of the policy be encrypted, encrypted chunks map 402 need not be used. Data can be written to and read from storage volume 110 without being encrypted. However, in response to activation of a policy on computing device 400 indicating that data stored on storage volume 110 after activation of the policy be encrypted, read/write control module 104 invokes encryption/decryption control module 102 to have data written to storage volume 110 encrypted. Read/write control module 104 also uses encrypted chunks map 402 to determine whether to decrypt data read from storage volume 110. Computing device 400 is thus in rapid compliance with the policy because data written to storage volume 110 after the policy is activated is encrypted. Computing device 400 need not wait until all of storage volume 100 is encrypted before being in compliance with the policy. Policy module 106 can thus rapidly indicate (e.g., with less than a threshold amount of delay) compliance with the policy even though some sectors of storage volume 110 are unencrypted, because subsequent writes to storage volume 110 will be encrypted, and device 400 thus will be encrypting data stored on storage volume 110 after activation of the policy.

In one or more embodiments, multiple versions of encrypted chunks map 402 are maintained. For example, two versions (a most recent version and a previous version) of encrypted chunks map 402 can be maintained. Each version typically has a version number or other identifier (e.g., with more recent versions having higher version numbers than less recent versions). When a change is made to encrypted chunks map 402, the previous version of encrypted chunks map 402 is replaced by the most recent version of encrypted chunks map 402, and then the change is made to the most recent version of encrypted chunks map 402. Thus, the two versions of encrypted chunks map 402 include a most recent version of encrypted chunks map 402, and the next most recent version of encrypted chunks map 402.

Additionally, versions of encrypted chunks map 402 can be can be maintained in memory (e.g., RAM) and persisted on a storage device (e.g., storage volume 110). In one or more embodiments, each time a change is made to a version of encrypted chunks map 402, the version in memory as well as the version persisted on the storage device are updated. Alternatively, at least part of encrypted chunks map 402 can be maintained in a nonvolatile memory (e.g., Flash memory) that maintains its state when computing device 400 is powered off, in which case versions of at least that part of encrypted chunks map 402 need not be both maintained in memory and persisted on a storage device.

After the policy (indicating that data stored on storage volume 110 after activation of the policy be encrypted) is activated, when data is requested to be read from a sector of storage volume 110, encrypted chunks map 402 is checked (e.g., by read/write control module 104 or policy module 106) to determine whether the chunk including the sector being read from is unencrypted (e.g., the bit corresponding to the chunk including the sector is not set). If the chunk is unencrypted, then read/write control module 104 reads the sector and returns the content of the sector to the requester. However, if the chunk has been encrypted or is not in use (e.g., the bit corresponding to the chunk including the sector is set), then read/write control module 104 invokes encryption/decryption control module 102 to decrypt the content of the sector, and returns the decrypted content of the sector to the requester.

After the policy (indicating that data stored on storage volume 110 after activation of the policy be encrypted) is activated, when data is requested to be written to a sector of storage volume 110, encrypted chunks map 402 is checked (e.g., by read/write control module 104 or policy module 106) to determine whether the chunk including the sector being written to is unencrypted (e.g., the bit corresponding to the chunk including the sector is not set). If the chunk is not unencrypted (the sectors in the chunk have already been encrypted or are not in use), then read/write control module 104 invokes encryption/decryption control module 102 to encrypt the content of the sector, and writes the encrypted content of the sector to storage volume 110.

However, if the chunk is unencrypted, then read/write control module 104 holds the write request to allow the other sectors in the chunk that includes the sector being written to be encrypted. Module 104 reads the content of the sectors in the chunk (e.g., all the sectors in the chunk, or those sectors in the chunk other than the sector to which data is requested to be written). Module 104 invokes encryption/decryption control module 102 to encrypt each of the sectors that is read, and writes the encrypted content of each of those sectors to storage volume 110.

Module 104 also maintains a record of the sectors that were encrypted in conversion log 404. Conversion log 404 includes identifiers of the sectors that were encrypted and signatures of the sectors, analogous to the sector identifiers and sector signatures of sector map 108 discussed above. However, the signatures in conversion log 404 are typically signatures of the sectors storing encrypted content. Conversion log 404 is maintained in memory (e.g., RAM) and persisted on a storage device (e.g., storage volume 110), analogous to versions of encrypted chunks map 402. Alternatively, conversion log 404 can be maintained in a nonvolatile memory (e.g., Flash memory) that maintains its state when computing device 400 is powered off, in which case conversion log 404 need not be both maintained in memory and persisted on a storage device. Additionally, multiple versions of conversion log 404 can be maintained, analogous to encrypted chunks map 402 versions.

After the encrypted content of the sectors is written to storage volume 110 and conversion log 404 (in memory and persisted on the storage device) is updated, encrypted chunks map 402 is changed to reflect that the chunk that includes the data being written to has been encrypted. For example, the bit corresponding to the chunk that includes the sector being written to is set. Read/write control module 104 then ceases holding the write request, and re-processes the write request. The chunk that includes the sector being written to is no longer unencrypted, and thus read/write control module 104 invokes encryption/decryption control module 102 to encrypt the content of the sector, and writes the encrypted content of the sector to storage volume 110 as discussed above. It should be noted that various changes to this ordering can be made. For example, the data being written can be encrypted prior to the write request being held.

Alternatively, rather than re-processing the write request, module 104 can read the content of the sectors in the chunk, replace the sector being written to with the content being written as part of the write request, and write the encrypted content of the sectors of the chunk to storage volume 110. Thus, the write request is effectively incorporated into the reading, encrypting, and writing of the chunk.

In one or more embodiments, in response to activating a policy on computing device 400 indicating that data stored on storage volume 110 after activation of the policy be encrypted, policy module 106 begins a process of identifying chunks of sectors of storage volume 110 that are not in use. Whether a particular sector of storage volume 110 is in use can be determined in different manners, such as by obtaining an indication from an operating system of computing device 400 as to which sectors are in use and which sectors are not in use. In response to detecting a chunk for which all sectors in the chunk are not in use, policy module 106 changes encrypted chunks map 402 to indicate that chunk is encrypted or not in use (e.g., a bit corresponding to that chunk is set). Thus, encrypted chunks map 402 can initially indicate that all chunks are unencrypted, and then have chunks marked as encrypted or not in use as those chunks are encrypted or identified as not in use.

Policy module 106 can perform this process of identifying chunks that are not in use in different manners. For example, policy module 106 can monitor computing device 400 for, and perform the process during, times of low storage volume usage (e.g., less than a threshold number of read and/or write access to storage volume 110 in a threshold amount of time). By way of another example, policy module 106 can monitor computing device 400 for, and perform the process during, times when computing device 400 is not typically being used (e.g., between midnight and 4:00 am). By way of yet another example, policy module 106 can monitor computing device 400 for, and perform the process during, times when computing device 400 is plugged in (e.g., operating on AC power rather than on battery power).

Similarly, in one or more embodiments policy module 106 can begin a process of encrypting the unencrypted data in sectors of storage volume 110. Policy module 106 can begin encrypting the unencrypted data in sectors of storage volume 110 at different times, such as after the process of identifying chunks of sectors of storage volume 110 that are not in use has been completed, in response to activating a policy on computing device 400 indicating that data stored on storage volume 110 after activation of the policy be encrypted, and so forth. Which sectors have unencrypted data can be readily identified (e.g., the sectors included in chunks having corresponding bits in encrypted chunks map 402 that are not set, other records or logs maintained by policy module 106 and/or an operating system of computing device 400). The encrypting of unencrypted data in sectors of storage volume 110 can be performed, for example, by requesting that the unencrypted data from sectors in a chunk be read and then written back to those sectors. As the request to write the data back to the sectors is received after the policy is activated, the data written back is encrypted. Once the encrypted sectors of a chunk are written back, encrypted chunks map 402 is changed to reflect that the chunk is no longer unencrypted (e.g., the bit corresponding to the chunk is set).

When no unencrypted data remains on storage volume 110, use of encrypted chunks map 402 can cease, and encrypted chunks map 402 can be deleted and/or ignored. The data that was written to storage volume 110 before encrypted chunks map 402 was used has been re-written as encrypted data, and data written to storage volume 110 using encrypted chunks map 402 is encrypted. Read/write control module 104 can simply invoke encryption/decryption control module 102 to encrypt data being written and decrypt data being read without using encrypted chunks map 402.

When performing such a process of encrypting the unencrypted data in sectors of storage volume 110, a record of which sectors have been encrypted can be maintained in different manners. For example, a separate log or record of which sectors have been encrypted can be maintained by policy module 106. By way of another example, after unencrypted data from sectors in a chunk is read and written back to the storage volume as encrypted data, a bit in encrypted chunks map 402 corresponding to the chunk can be set.

Policy module 106 can perform this process of encrypting unencrypted sectors in different manners. For example, policy module 106 can monitor computing device 400 for, and perform the process during, times of low storage volume usage (e.g., less than a threshold number of read and/or write access to storage volume 110 in a threshold amount of time). By way of another example, policy module 106 can monitor computing device 400 for, and perform the process during, times when computing device 400 is not typically being used (e.g., between midnight and 4:00 am). By way of yet another example, policy module 106 can monitor computing device 400 for, and perform the process during, times when computing device 400 is plugged in (e.g., operating on AC power rather than on battery power).

Although a single encrypted chunks map 402 is illustrated in computing device 400, alternatively multiple encrypted chunks maps 402 can be included (each having multiple versions as discussed above). These different encrypted chunks maps 402 can correspond to different parts of storage volume 110. These different parts can be determined in different manners, such as particular collections of sectors of storage volume 110 having a particular size (e.g., collections of sectors totaling 2-4 Gigabytes). Each of these different encrypted chunks maps is used as discussed above, and which of the multiple encrypted chunks maps is used is dependent on the particular sector or sectors being read from or written to for a particular request.

Situations can arise in which computing device 400 crashes or loses power during a write, such as when data is being written to storage volume 110, when a conversion log or encrypted chunks map is being persisted, and so forth. To resolve such situations, when computing device 400 boots (e.g., due to being restarted, reset, etc.) read/write control module 104 retrieves the most recent valid version of encrypted chunks map 402 persisted on storage volume 110. Whether a particular version of encrypted chunks map 402 is valid can be determined in different manners (e.g., based on a checksum or other value stored with the encrypted chunks map 4020 on storage volume 110). Read/write control module 104 also retrieves the most recent valid version of conversion log 404 persisted on storage volume 110. Whether a particular version of conversion log 404 is valid can be determined in different manners (e.g., based on a checksum or other value stored with the conversion log 404 on storage volume 110).

Conversion log 404 includes an indication of the most recently encrypted sector (or chunk). For the most recently encrypted sector (or chunk), if encrypted chunks map 402 indicates that the chunk that includes the most recently encrypted sector (or the most recently encrypted chunk) is not unencrypted (e.g., the bit corresponding to the chunk is set), then no recovery need be performed. However, if encrypted chunks map 402 indicates that the chunk that includes the most recently encrypted sector (or the most recently encrypted chunk) is unencrypted (e.g., the bit corresponding to the chunk is not set), then recovery may be performed. What recovery is to be performed can be determined in different manners, such as based on signatures of the sectors (e.g., which sectors in the chunk have been encrypted can be determined based on the signatures—if the signature of the sector in conversion log 404 matches (e.g., is the same as) the signature of the sector on storage volume 110 then the sector has been encrypted, and if the signatures do not match then the sector has not been encrypted). Sectors in the chunk that have not been encrypted are encrypted, and the bit in the encrypted chunks map 402 corresponding to the chunk is set. One or more other operating system modules supporting recovery can optionally be invoked to perform the recovery.

Signatures of encrypted sectors are discussed above as stored in conversion log 404. Alternatively, the signatures in conversion log 404 can be signatures of unencrypted sectors. In such situations, a sector can be decrypted and the signature of the unencrypted content of the sector generated. If the signature of the unencrypted content of the sector matches (e.g., is the same as) the signature of the sector in conversion log 404 then the sector has been encrypted, and if the signatures do not match then the sector has not been encrypted.

Figure 5:
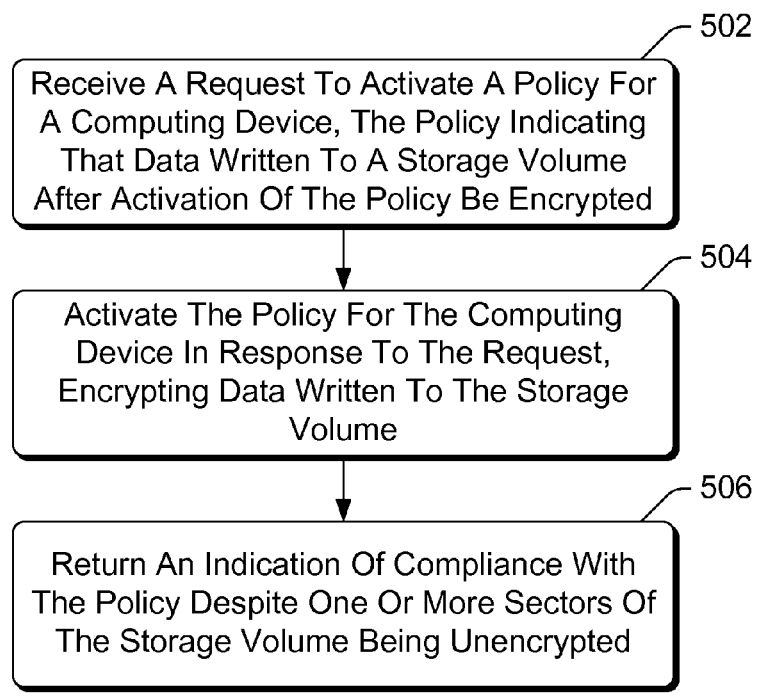
FIG. 5 is a flowchart illustrating an example process for implementing rapid compliance with a data encryption policy in accordance with one or more embodiments.

FIG. 5 is a flowchart illustrating an example process 500 for implementing rapid compliance with a data encryption policy in accordance with one or more embodiments. Process 500 is carried out by a computing device, such as computing device 100 of FIG. 1, and can be implemented in software, firmware, hardware, or combinations thereof. Process 500 is shown as a set of acts and is not limited to the order shown for performing the operations of the various acts. Process 500 is an example process for implementing rapid compliance with a data encryption policy; additional discussions of implementing rapid compliance with a data encryption policy are included herein with reference to different figures.

In process 500, a request to activate a policy for a computing device is received (act 502). The policy indicates that data written by the computing device to a storage volume after activation of the policy be encrypted. The request can be received from various sources, such as user of the computing device, a service being accessed by the computing device, an administrator of a network to which the computing device is coupled, and so forth.

The policy is activated for the computing device in response to the request (act 504). By activating the policy, data written to the storage volume after returning the indication of compliance with the policy is encrypted, despite one or more sectors of the storage volume being unencrypted (plaintext).

An indication of compliance with the policy is also returned in response to the request (act 506). This indication can be returned immediately as a rapid indication of compliance, and can be returned despite one or more sectors of the storage volume being unencrypted (plaintext).

Figure 6:
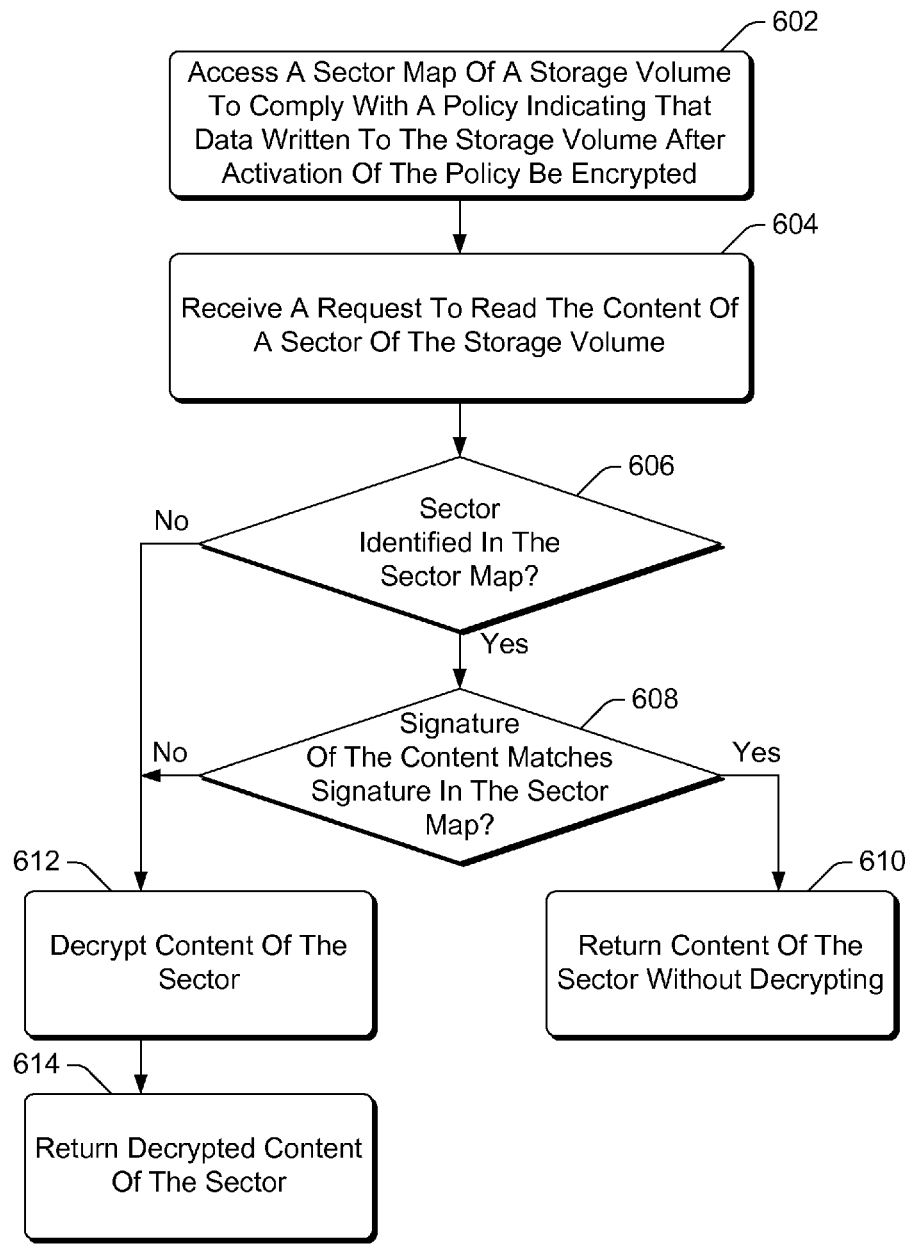
FIG. 6 is a flowchart illustrating another example process for implementing rapid compliance with a data encryption policy using a sector map in accordance with one or more embodiments.

FIG. 6 is a flowchart illustrating an example process 600 for implementing rapid compliance with a data encryption policy using a sector map in accordance with one or more embodiments. Process 600 is carried out by a computing device, such as computing device 100 of FIG. 1, and can be implemented in software, firmware, hardware, or combinations thereof. Process 600 is shown as a set of acts and is not limited to the order shown for performing the operations of the various acts. Process 600 is an example process for implementing rapid compliance with a data encryption policy using a sector map; additional discussions of implementing rapid compliance with a data encryption policy using a sector map are included herein with reference to different figures.

In process 600, a sector map identifying one or more sectors of a storage volume is accessed (act 602). The sector map is accessed to comply with a policy indicating that data written by the computing device to the storage volume after activation of the policy be encrypted. The sector map is typically accessed from volatile memory as discussed above, and can be copied into volatile memory from the storage volume as appropriate.

After activation of the policy, a request to read the content of a sector of the storage volume is received (act 604). In response to the request, a check is made as to whether the sector is identified in the sector map (act 606).

If the sector is identified in the sector map, then a check is made as to whether the signature of the content of the sector matches the signature for that sector as identified in the sector map (act 608). If the signature of the content of the sector matches the signature for that sector as identified in the sector map, then the content of the sector is returned without decrypting the content (act 610). The content is returned to a requester from which the request to read the content was received, such as another program or application running on the computing device.

However, if the signature of the content of the sector does not match the signature for that sector as identified in the sector map in act 608, or if the sector is not identified in the sector map in act 606, then the content of the sector is decrypted (act 612), and the decrypted content is returned (act 614). The content is returned to a requester from which the request to read the content was received, such as another program or application running on the computing device.

Alternatively, a bitmap with bits indicating whether corresponding sectors have been written to after the sector map was locked can be used as discussed above. When using such a bitmap, an additional act prior to act 606 is included in process 600, the additional act being checking whether the bitmap indicates that the sector has been written to after the sector map was locked. If the bitmap indicates that the sector has been written to after the sector map was locked, then the content of the sector is decrypted (act 612) and returned (act 614). However, if the bitmap indicates that the sector has not been written to after the sector map was locked, then process 600 proceeds to act 606.

Figure 7:
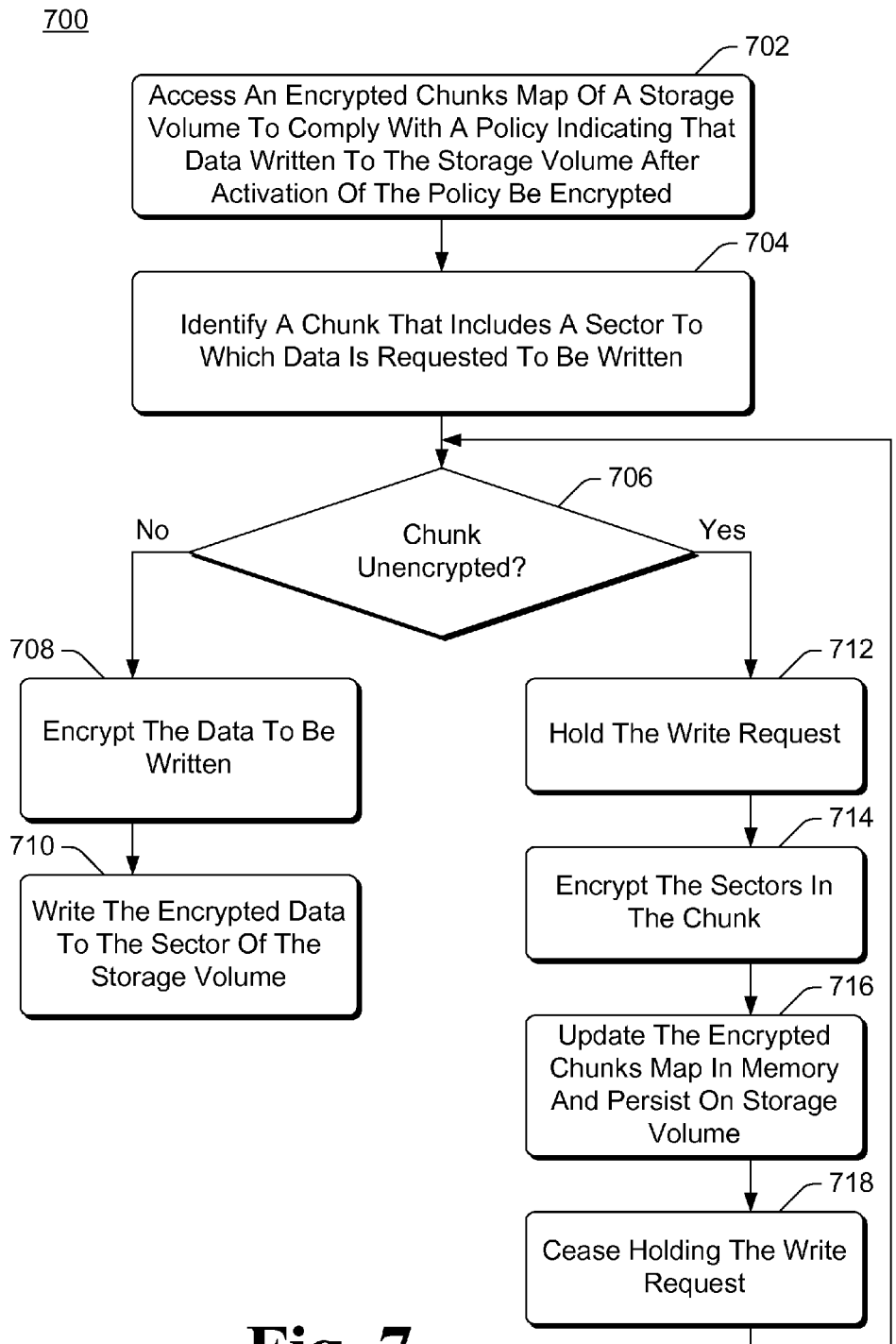
FIG. 7 is a flowchart illustrating an example process for implementing rapid compliance with a data encryption policy using an encrypted chunks map in accordance with one or more embodiments.

FIG. 7 is a flowchart illustrating an example process for implementing rapid compliance with a data encryption policy using an encrypted chunks map in accordance with one or more embodiments. Process 700 is carried out by a computing device, such as computing device 100 of FIG. 1, and can be implemented in software, firmware, hardware, or combinations thereof. Process 700 is shown as a set of acts and is not limited to the order shown for performing the operations of the various acts. Process 700 is an example process for implementing rapid compliance with a data encryption policy using an encrypted chunks map; additional discussions of implementing rapid compliance with a data encryption policy using an encrypted chunks map are included herein with reference to different figures.

In process 700, an encrypted chunks map identifying one or more chunks of sectors of a storage volume is accessed (act 702). The encrypted chunks map is accessed to comply with a policy indicating that data written by the computing device to the storage volume after activation of the policy be encrypted.

A chunk that includes a sector to which data is requested to be written is identified (act 704). Which sectors are included in which chunks can be determined in different manners, as discussed above.

A determination is made as to whether the chunk is unencrypted (act 706). This determination is made based on the encrypted chunks map as discussed above. For example, if a bit in the encrypted chunks map corresponding to the chunk is not set then the chunk is unencrypted, and if the bit in the encrypted chunks map corresponding to the chunk is set then the chunk is encrypted (or not in use).

If the chunk is not unencrypted, then the data to be written to the sector is encrypted (act 708), and the encrypted data is written to the sector of the storage volume (act 710).

However, if the chunk is unencrypted, then the write request is placed on hold (act 712). Placing the write request on hold allows the sectors in the chunk that includes the sector to which data is requested to be written to be encrypted.

The sectors in the chunk that includes the sector to which data is requested to be written are encrypted (act 714). All sectors included in the chunk can be encrypted, or alternatively sectors in the chunk other than the sector to which data is requested to be written can be encrypted as discussed above.

The encrypted chunks map is updated in memory and the updated map is persisted on the storage volume (act 716). The update to the encrypted chunks map is a change to the encrypted chunks map to reflect that the chunk including the sectors that were encrypted in act 714 is no longer unencrypted as discussed above. Multiple versions of the encrypted chunks map can also be maintained as discussed above.

The hold on the write request ceases (act 718), and process 700 returns to act 706 to again check whether the chunk is unencrypted. As the chunk is no longer unencrypted, process 700 proceeds to acts 708 and 710 as discussed above. Alternatively, process 700 can return to act 708 rather than act 706.

The rapid compliance with data encryption policy techniques discussed herein support various usage scenarios, allowing a rapid indication to be provided of compliance with a policy indicating that data written to a storage volume after activation of the policy be encrypted despite one or more sectors of the storage volume being unencrypted. For example, the sector map can be used to identify which sectors were written to prior to the sector map being locked. This sector map can be locked when an operating system is installed or initialized on the computing device, or alternatively in response to the request to comply with the policy.

Regardless of when the sector map is locked, after being locked data written to the storage volume is encrypted, and the sector map can be used to determine whether to decrypt or not decrypt data based on when the data was written to the storage volume. By way of another example, the encrypted chunks map can be used to identify which chunks of sectors are unencrypted after application of the policy to the computing device. Data written to sectors after activation of the policy is encrypted, and the encrypted chunks map can be used to determine whether to decrypt or not decrypt data based on whether the chunk that includes the sector from which data is read is unencrypted.

Various actions such as receiving, returning, recording, storing, generating, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 8:
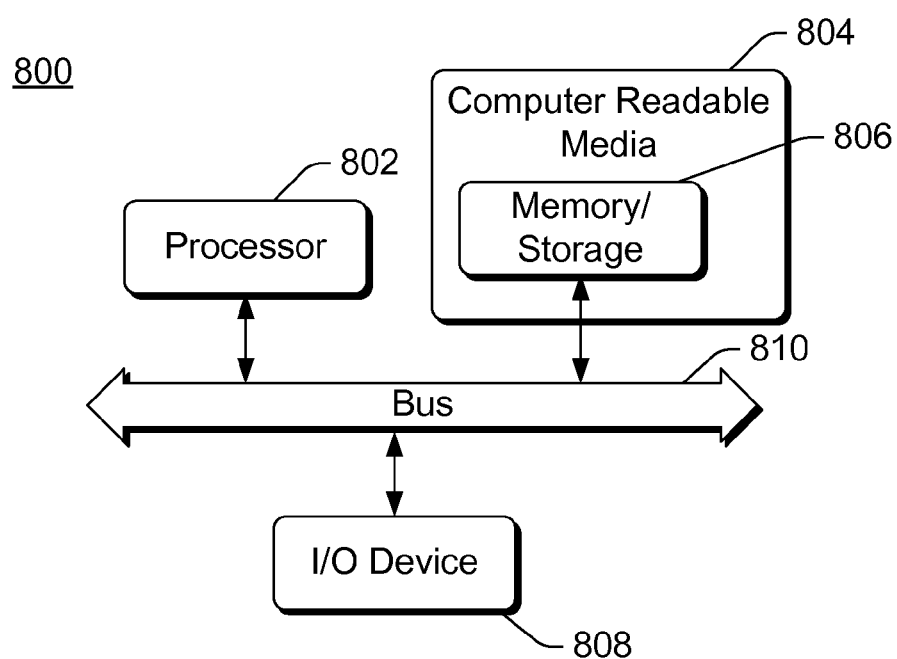
FIG. 8 illustrates an example computing device that can be configured to implement rapid compliance with a data encryption policy in accordance with one or more embodiments.

FIG. 8 illustrates an example computing device 800 that can be configured to implement rapid compliance with a data encryption policy in accordance with one or more embodiments. Computing device 800 can be, for example, computing device 100 of FIG. 1.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Processor 802, computer readable media 804, one or more of devices 808, and/or bus 810 can optionally be implemented as a single component or chip (e.g., a system on a chip). Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the rapid compliance with data encryption policy techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a computing device, a request to activate a policy for the computing device, the policy indicating that data written by the computing device to a storage volume after activation of the policy be encrypted;
activating, in response to the request, the policy for the computing device, including:
encrypting data written to the storage volume after returning an indication of compliance with the policy,
using a sector map to identify one or more sectors of the storage volume that are not encrypted, the sector map identifying one or more sectors of the storage volume written to prior to the sector map being locked to prohibit changes to the sector map and the sector map including signatures of sectors that were written to the storage volume prior to the sector map being locked, data written to the storage volume after the sector map is locked being encrypted but at least some data written to the storage volume before the sector map is locked not being encrypted, and
using the sector map to determine whether to decrypt content of a sector of the storage volume in response to a request to read the content of the sector; and
returning, in response to the request to activate the policy, the indication of compliance with the policy despite one or more sectors of the storage volume being unencrypted.

2. A method as recited in claim 1, the returning comprising returning the response without waiting for the storage volume to be encrypted.

3. A method as recited in claim 1, the activating further comprising returning, in response to the request to read the content, the content without decrypting the content in response to the sector being one of the one or more sectors written to prior to the sector map being locked and the signature of the content of the sector matching the signature of the sector identified in the sector map, and otherwise decrypting the content of the sector and returning the decrypted content.

4. A method as recited in claim 1, the activating further comprising:
checking a bit corresponding to the sector, the bit being one of multiple bits in a bitmap corresponding to the storage volume, each of the multiple bits indicating whether a corresponding sector of the storage volume has been written to after the sector map was locked to prohibit changes to the sector map;
decrypting the content of the sector and returning the decrypted content in response to the bit corresponding to the sector indicating the sector has been written to after the sector map was locked; and
in response to the bit corresponding to the sector indicating the sector has not been written to after the sector map was locked, returning the content without decrypting the content in response to the sector being one of the one or more sectors written to prior to the sector map being locked and the signature of the content of the sector matching the signature of the sector identified in the sector map, and otherwise decrypting the content of the sector and returning the decrypted content.

5. A method as recited in claim 1, the sector map being locked in response to the request to activate the policy for the computing device.

6. A method as recited in claim 5, further comprising, prior to the sector map being locked:
maintaining a first version of the sector map on the storage volume;
maintaining a second version of the sector map in volatile memory;
grouping the sector identifiers and sector signatures into multiple groups, each group including sector signatures for one or more sectors;
updating, in response to data being written to a sector identified in a group, a flag value of the group to indicate that the group is dirty; and
copying the groups that are indicated as dirty from the second version of the sector map to the first version of the sector map in response to a threshold number of the multiple groups being indicated as dirty.

7. A method as recited in claim 1, further comprising maintaining the sector map on the storage volume, and mapping the sector map from the storage volume into a sector map in volatile memory when the computing device starts operation.

8. A method as recited in claim 1, further comprising:
encrypting unencrypted data from sectors of the storage volume;
determining when no unencrypted data remains on the storage volume; and
deleting the sector map and ceasing using the sector map in response to no unencrypted data remaining on the storage volume.

9. A method as recited in claim 8, further comprising removing, from the sector map, an identifier and corresponding signature of a sector in response to unencrypted data from the sector being encrypted.

10. A method as recited in claim 1, the signature of the content of the sector comprising a value generated as a function of the content of the sector.

11. A method as recited in claim 1, the storage volume being included as part of the computing device.

12. A computing device comprising:
one or more hardware processors; and
one or more computer storage media devices having stored thereon multiple instructions that, when executed by the one or more processors to comply with a policy for the computing device, cause the one or more processors to:
access a sector map identifying one or more sectors of a storage volume written to prior to changes to the sector map being locked to prohibit changes to the sector map, the sector map further identifying, for each of the one or more sectors, a signature of the content of the sector, the policy indicating that data written by the computing device to the storage volume after activation of the policy be encrypted;
in response to a request to read the content of a sector of the storage volume:
read the content of the sector from the storage volume and return the content of the sector of the storage volume without decrypting the content in response to both the sector not having been written to after the sector map was locked to prohibit changes to the sector map and the signature of the content of the sector matching the signature of the sector identified in the sector map; and
read the content of the sector from the storage volume, decrypt the content of the sector of the storage volume, and return the decrypted content in response to the sector having been written to after the sector map was locked to prohibit changes to the sector map.

13. A computing device as recited in claim 12, the sector map being locked in response to a request to activate the policy for the computing device.

14. A computing device as recited in claim 13, the multiple instructions further causing the one or more processors to, prior to the sector map being locked:
maintain a first version of the sector map on the storage volume;
maintain a second version of the sector map in volatile memory;
group the sector identifiers and sector signatures into multiple groups, each group including sector signatures for one or more sectors;
update, in response to data being written to a sector identified in a group, a flag value of the group to indicate that the group is dirty; and
copy the groups that are indicated as dirty from the second version of the sector map to the first version of the sector map in response to a threshold number of the multiple groups being indicated as dirty.

15. A computing device as recited in claim 12, the multiple instructions further causing the one or more processors to:
encrypt unencrypted data from sectors of the storage volume;
determine when no unencrypted data remains on the storage volume; and
delete the sector map and ceasing using the sector map in response to no unencrypted data remaining on the storage volume.

16. A computing device as recited in claim 15, the multiple instructions further causing the one or more processors to remove, from the sector map, an identifier and corresponding signature of a sector in response to unencrypted data from the sector being encrypted.

17. A method, implemented in a computing device, to comply with a policy for the computing device, the method comprising:
accessing a sector map identifying one or more sectors of a storage volume written to prior to changes to the sector map being locked to prohibit changes to the sector map, the sector map further identifying, for each of the one or more sectors, a signature of the content of the sector, the policy indicating that data written by the computing device to the storage volume after activation of the policy be encrypted;
in response to a request to read the content of a sector of the storage volume:
reading the content of the sector from the storage volume and returning the content of the sector of the storage volume without decrypting the content in response to both the sector not having been written to after the sector map was locked to prohibit changes to the sector map and the signature of the content of the sector matching the signature of the sector identified in the sector map; and reading the content of the sector from the storage volume, decrypting the content of the sector of the storage volume, and returning the decrypted content in response to the sector having been written to after the sector map was locked to prohibit changes to the sector map.

18. A method as recited in claim 17, further comprising locking the sector map in response to a request to activate the policy for the computing device.

19. A method as recited in claim 18, further comprising, prior to the sector map being locked:
maintaining a first version of the sector map on the storage volume;
maintaining a second version of the sector map in volatile memory;
grouping the sector identifiers and sector signatures into multiple groups, each group including sector signatures for one or more sectors;
updating, in response to data being written to a sector identified in a group, a flag value of the group to indicate that the group is dirty; and
copying the groups that are indicated as dirty from the second version of the sector map to the first version of the sector map in response to a threshold number of the multiple groups being indicated as dirty.

20. A method as recited in claim 17, further comprising:
encrypting unencrypted data from sectors of the storage volume;
determining when no unencrypted data remains on the storage volume; and
deleting the sector map and ceasing using the sector map in response to no unencrypted data remaining on the storage volume.

21. The method as recited in claim 17, further comprising encrypting data written by the computing device to at least one sector of the storage volume regardless of whether the sector of the storage volume is one of the one or more sectors.

22. A computing device comprising:
one or more hardware processors; and
one or more computer storage media devices having stored thereon multiple instructions that, when executed by the one or more processors to comply with a policy for the computing device, cause the one or more processors to:
receive a request to activate a policy for the computing device, the policy indicating that data written by the computing device to a storage volume after activation of the policy be encrypted;
activate, in response to the request, the policy for the computing device, including:
encrypting data written to the storage volume after returning an indication of compliance with the policy,
using a sector map to identify one or more sectors of the storage volume that are not encrypted, the sector map identifying one or more sectors of the storage volume written to prior to the sector map being locked to prohibit changes to the sector map and the sector map including signatures of sectors that were written to the storage volume prior to the sector map being locked, data written to the storage volume after the sector map is locked being encrypted but at least some data written to the storage volume before the sector map is locked not being encrypted, and
using the sector map to determine whether to decrypt content of a sector of the storage volume in response to a request to read the content of the sector; and
return, in response to the request to activate the policy, the indication of compliance with the policy despite one or more sectors of the storage volume being unencrypted.

23. The computing device as recited in claim 22, the sector map being locked in response to the request to activate the policy for the computing device.

24. The computing device as recited in claim 22, the multiple instructions further causing the one or more processors to:
encrypt unencrypted data from sectors of the storage volume;
determine when no unencrypted data remains on the storage volume; and
delete the sector map and cease using the sector map in response to no unencrypted data remaining on the storage volume.

* * * * *